(12) United States Patent
Byeon et al.

(10) Patent No.: US 9,791,749 B2
(45) Date of Patent: Oct. 17, 2017

(54) DISPLAY DEVICE

(71) Applicant: Samsung Display Co., Ltd., Yongin-si (KR)

(72) Inventors: Hyung Sup Byeon, Seoul (KR); Sung Hoon Kim, Seoul (KR); Ji-Won Sohn, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/357,417

(22) Filed: Nov. 21, 2016

(65) Prior Publication Data

US 2017/0068136 A1    Mar. 9, 2017

Related U.S. Application Data

(63) Continuation of application No. 13/927,713, filed on Jun. 26, 2013, now Pat. No. 9,513,521.

(30) Foreign Application Priority Data

Dec. 31, 2012 (KR) ........................ 10-2012-0158265

(51) Int. Cl.
*G02F 1/133* (2006.01)
*G02F 1/1343* (2006.01)
(Continued)

(52) U.S. Cl.
CPC .. *G02F 1/134309* (2013.01); *G02F 1/133514* (2013.01); *G02F 1/134363* (2013.01);
(Continued)

(58) Field of Classification Search
CPC .................................................. G02F 1/13306
See application file for complete search history.

(56) References Cited

U.S. PATENT DOCUMENTS 6,791,651 B2  9/2004 Jo et al.
7,196,748 B2  3/2007 Chae
(Continued)

FOREIGN PATENT DOCUMENTS

JP  2002-296615  10/2002
JP  2006-179878  7/2006
(Continued)

OTHER PUBLICATIONS

Non-Final Office Action dated Nov. 18, 2015 in U.S. Appl. No. 13/927,713.
(Continued)

*Primary Examiner* — Timothy L Rude
(74) *Attorney, Agent, or Firm* — H.C. Park & Associates, PLC

(57) ABSTRACT

A display device including: a substrate including a display area in which pixels are positioned and a peripheral area around the display area; a common electrode and a pixel electrode that are positioned on the display area and overlapping with each other, with a first insulating layer disposed therebetween; a common voltage line positioned on or below the common electrode and contacting the common electrode; an edge common voltage line connected with the common voltage line and formed along an edge of the display area; and a first common voltage transfer line contacting the edge common voltage line in the peripheral area and configured to transfer a common voltage to the common voltage line.

18 Claims, 35 Drawing Sheets

(51) Int. Cl.
*G02F 1/1362* (2006.01)
*G02F 1/1335* (2006.01)
*G02F 1/1333* (2006.01)

(52) U.S. Cl.
CPC .. *G02F 1/136227* (2013.01); *G02F 1/136286* (2013.01); *G02F 2001/13629* (2013.01); *G02F 2001/133388* (2013.01); *G02F 2201/121* (2013.01); *G02F 2201/123* (2013.01)

(56) References Cited

U.S. PATENT DOCUMENTS

| | | | |
|---|---|---|---|
| 7,292,302 | B2 | 11/2007 | Min et al. |
| 7,663,724 | B2 | 2/2010 | Lim et al. |
| 7,859,078 | B2 | 12/2010 | Hotta |
| 8,134,674 | B2 | 3/2012 | Lim et al. |
| 8,144,295 | B2 | 3/2012 | Chang et al. |
| 8,144,296 | B2 | 3/2012 | Kwon |
| 8,314,915 | B2 | 11/2012 | Ota |
| 9,052,554 | B2 | 6/2015 | Ota et al. |
| 9,377,636 | B2 * | 6/2016 | Kim ................... G02F 1/1345 |
| 9,455,276 | B2 * | 9/2016 | Byeon ................. H01L 27/124 |
| 9,465,268 | B2 * | 10/2016 | Park ................. G02F 1/134363 |
| 2007/0165149 | A1 | 7/2007 | Kim et al. |
| 2008/0106656 | A1 * | 5/2008 | Zhang ............ G02F 1/134363 349/33 |
| 2008/0225194 | A1 * | 9/2008 | Harada ............ G02F 1/136227 349/46 |
| 2009/0323005 | A1 | 12/2009 | Ota |
| 2010/0149476 | A1 | 6/2010 | Kim et al. |
| 2013/0307761 | A1 | 11/2013 | Kwak et al. |
| 2014/0002761 | A1 | 1/2014 | Heo et al. |

FOREIGN PATENT DOCUMENTS

| | | |
|---|---|---|
| JP | 2007-048863 | 2/2007 |
| JP | 2007-193334 | 8/2007 |
| JP | 2008-016600 | 1/2008 |
| JP | 2008-257168 | 10/2008 |
| JP | 2010-008758 | 1/2010 |
| JP | 2011-053443 | 3/2011 |
| JP | 2012-124506 | 6/2012 |
| KR | 10-2003-0090520 | 11/2003 |
| KR | 10-2005-0058589 | 6/2005 |
| KR | 10-0524873 | 10/2005 |
| KR | 10-2006-0072743 | 6/2006 |
| KR | 10-2007-0088886 | 8/2007 |
| KR | 10-2008-0056960 | 6/2008 |
| KR | 10-2012-0058231 | 6/2012 |
| KR | 10-2013-0128254 | 11/2013 |

OTHER PUBLICATIONS

Final Office Action dated Mar. 16, 2016 in U.S. Appl. No. 13/927,713.

Notice of Allowance dated Aug. 1, 2016 in U.S. Appl. No. 13/927,713.

* cited by examiner

DISPLAY DEVICE

CROSS-REFERENCE TO RELATED APPLICATION

This application is a Divisional of U.S. patent application Ser. No. 13/927,713, filed on Jun. 26, 2013, now issued as U.S. Pat. No. 9,513,521, and claims priority to and the benefit of Korean Patent Application No. 10-2012-0158265, filed on Dec. 31, 2012, which is hereby incorporated by reference for all purposes as if fully set forth herein.

BACKGROUND

Field

The present disclosure relates to a display device, and more particularly, to a display device including a common voltage transfer line.

Discussion of the Background

Display devices presently include a liquid crystal display, an organic light emitting diode display, an electrophoretic display, and the like.

Such display devices include a plurality of pixels and a plurality of display signal lines. Each pixel includes a switching element and a pixel electrode connected thereto, and the switching element is connected with the display signal line. The display signal line includes a gate line to transfer a gate signal and a data line to transfer a data voltage. The pixel electrode receives the data voltage according to a gate signal, through the switching element. The switching element may be a three-terminal element such as a thin film transistor. The pixel electrode, the switching element, and the like may be positioned on a thin film transistor array panel.

As one example of the display devices, a liquid crystal display, which is one of the most common types of flat panel displays currently in use, includes two sheets of display panels with field generating electrodes, such as a pixel electrode, a common electrode, and the like, and a liquid crystal layer interposed therebetween. The liquid crystal display generates an electric field in the liquid crystal layer by applying a voltage to the field generating electrodes. The electric field determines the direction of liquid crystal molecules of the liquid crystal layer, thus controlling polarization of incident light so as to display images.

The display panel i may include a common voltage applying line to transfer a common voltage Vcom to the common electrode. Since an image displayed by each pixel depends on a difference between the data voltage and the common voltage, the magnitudes of common voltages applied to the pixels should be uniform. However, the magnitudes of the common voltages may not be uniform in certain portions of the display panel, due to load variations resulting from wiring transferring the common voltage to the display panel, the resistance of an electrode, parasitic capacitance, or the like. As a result, a display defects may occur.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a display device having advantages of reducing display defects by reducing positional deviations of a common voltage applied to a display panel.

Exemplary embodiments of present invention also provide a display device having advantages of reducing a signal delay of the common voltage by reducing the contact resistance at a portion that applies the common voltage to the display panel.

In addition, exemplary embodiments of the present invention provide a display device having advantages of reducing the area of an edge region of the display panel by reducing the area of a portion that applies the common voltage to the display panel, and increasing the degree of freedom in a design of the edge region of the display panel.

Additional features of the invention will be set forth in the description which follows, and in part will be apparent from the description, or may be learned by practice of the invention.

An exemplary embodiment of the present invention provides a display device, including: a substrate including a display area in which a plurality of pixels is positioned and a peripheral area around the display area; a common electrode and a pixel electrode that are positioned on the display area of the substrate and overlapping with each other with a first insulating layer therebetween; a common voltage line positioned on or below the common electrode and contacting the common electrode; an edge common voltage line connected with the common voltage line and formed along an edge of the display area; and a first common voltage transfer line contacting the edge common voltage line in the peripheral area and transferring a common voltage to the common voltage line.

According to various embodiments of the present invention, it is possible to reduce display defects by reducing positional deviations of a common voltage applied to a display panel of a display device. Further, it is possible to reduce common voltage deviations due to a signal delay of the common voltage, by reducing the contact resistance at a portion that applies the common voltage to the display panel. In addition, it is possible to reduce an area of an edge region of a display panel by reducing an area of a portion that applies the common voltage to the display panel and increase the degree of freedom in the design of the edge region of the display panel.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE EXEMPLARY EMBODIMENTS

Figure 1:
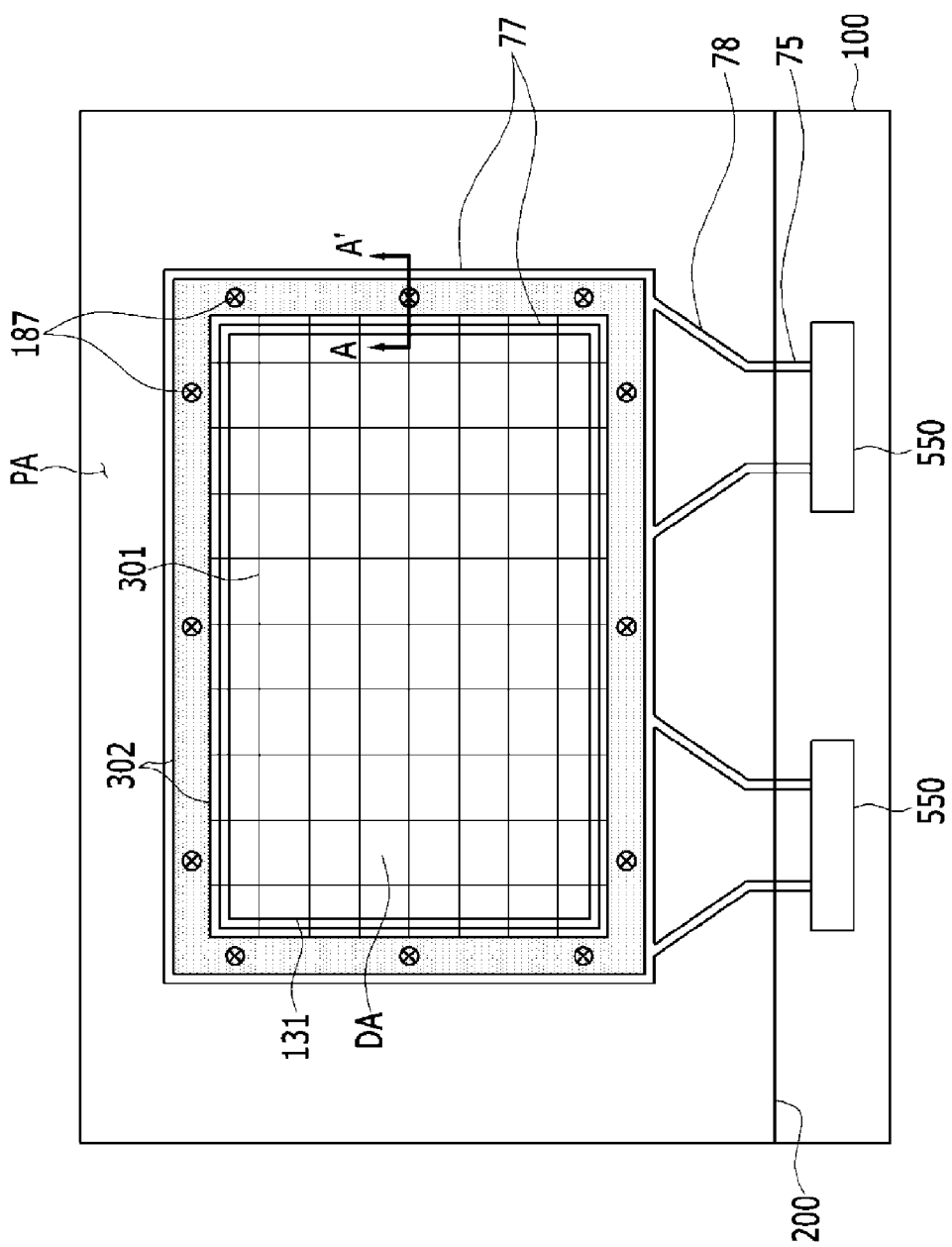
FIGS. 1 and 2 are plan views of a display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
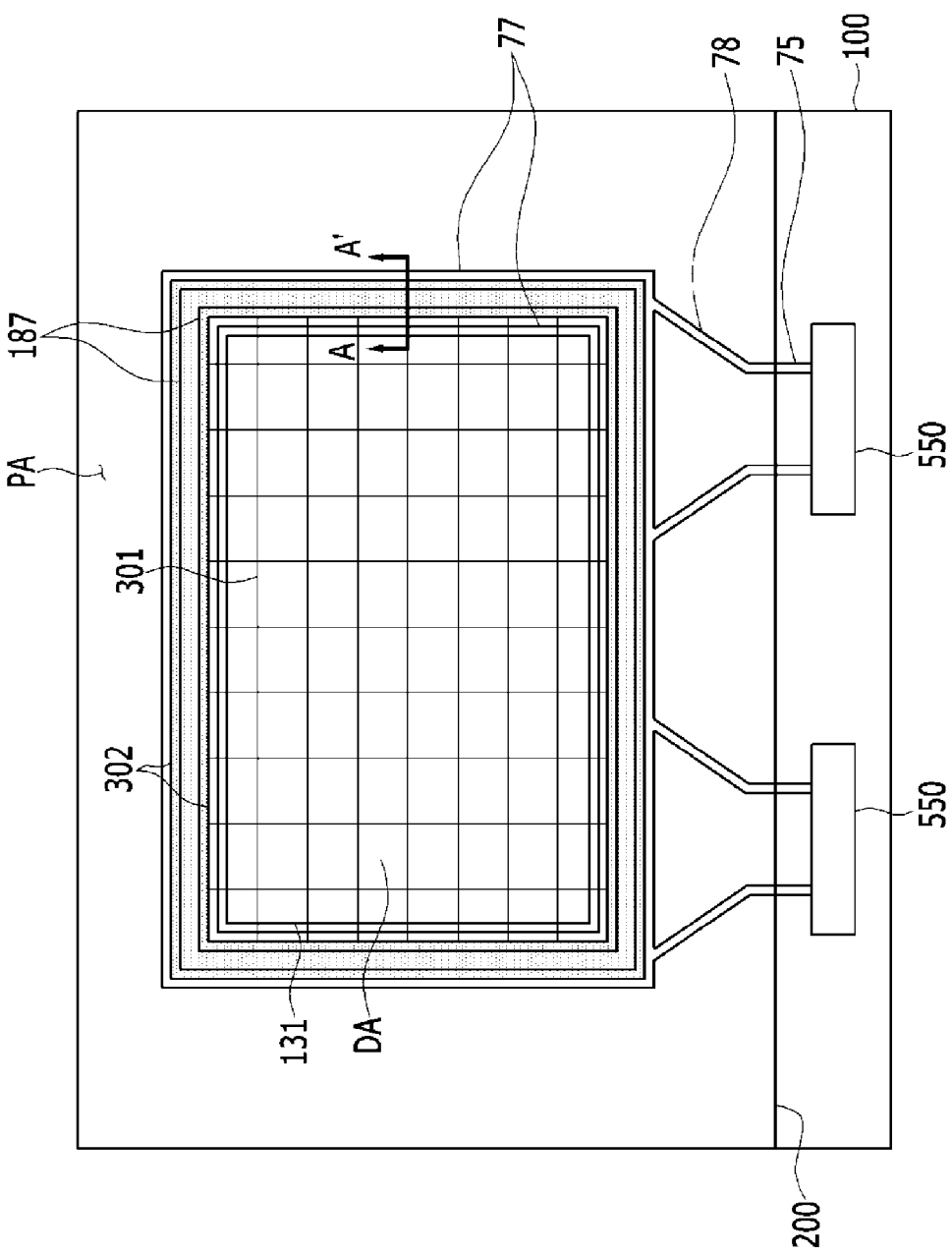

FIGS. 1 and 2 are plan views of a display device according to an exemplary embodiment of the present invention. Referring to FIGS. 1 and 2, a display device according to an exemplary embodiment of the present invention includes a first display panel 100 including a display area DA to display an image and a peripheral area PA disposed around the display area DA, and a second display panel 200 facing the first display panel 100. A light blocking member (not illustrated) is positioned in the peripheral area PA, and the display area DA may be at least partially defined by an opening of the light blocking member of the peripheral area PA. In the case of a liquid crystal display, a liquid crystal layer (not illustrated) may be positioned between the first display panel 100 and the second display panel 200.

A plurality of driving signal lines and a plurality of pixels connected to the driving signal lines are disposed in the display area DA. The pixels are arranged in a matrix.

The driving signal lines include a plurality of gate lines (not illustrated) to transfer gate signals (referred to as "scanning signals") and a plurality of data lines (not illustrated) to transfer data voltages.

Further, a common voltage line 301 to transfer a common voltage Vcom and a common electrode 131 connected with the common voltage line 301 are positioned in the display area DA. The common electrode 131 is formed on the entire surface of the display area DA and may include at least one opening. The common electrode 131 may be made of a transparent conductive material such as ITO or IZO. In FIGS. 1 and 2, the common electrode 131 is formed only in the display area DA, but is not limited thereto. For example, the common electrode 131 may extend into the peripheral area PA.

The common voltage line 301 may include horizontal portions that extend in a row direction and vertical portions that extend in a column direction. In this case, the horizontal portions and the vertical portions are connected to each other. The common voltage line 301 may be overlapped with the driving signal lines, for example, the gate lines and the data lines. In this case, a width of the common voltage line 301 may be larger than or equal to a width of the overlapped driving signal lines. However, according to another exemplary embodiment of the present invention, any one of the horizontal portion and the vertical portion may be omitted.

The common voltage line 301 may be made of opaque metal having a high electrical conductivity. For example, the common voltage line 301 may be include a single layer made of aluminum (Al), molybdenum (Mo), titanium (Ti), copper (Cu), or an alloy thereof, or a multilayer thereof. However, according to another exemplary embodiment of the present invention, the common voltage line 301 may be made of a conductive organic material having a high electrical conductivity. In this case, the reflection of light may be prevented and an aperture ratio of the liquid crystal display may be increased.

The common voltage line 301 may directly contact the common electrode 131 directly above or below the common electrode 131. The common voltage line 301 may be electrically and physically connected with the common electrode 131, through a contact hole of an insulating layer (not illustrated) disposed between the common voltage line 301 and the common electrode 131.

By forming the common voltage line 301 in the display area DA, it is possible to prevent a signal delay of the common voltage applied to the common electrode 131. When the common voltage line 301 directly contacts the common electrode 131, the contact hole is not required. As a result, it is possible to prevent a reduction of the aperture ratio due to the contact hole. Further, when the common voltage line 301 is overlapped with the opaque driving signal line, it is possible to prevent a reduction of the aperture ratio of the display device.

Each pixel may include a switching element, such as a thin film transistor, connected to the driving signal line. Each pixel may also include a pixel electrode (not illustrated) connected to the switching element, and a common electrode (also referred to as an opposed electrode) facing the pixel electrode. In the case of an organic light emitting diode display, an emission layer is positioned between the pixel electrode and the common electrode, to form a light emitting diode. That is, the pixel electrode serves as an anode and the common electrode serves as a cathode. The emission layer emits light according to an output current between the anode and the cathode, thereby displaying images. In the case of the liquid crystal display, the pixel electrode and the common electrode, which may be included in one or both of the display panels 100 and 200, respectively are positioned with a liquid crystal layer therebetween to generate an electric field in the liquid crystal layer. Directions of liquid crystal molecules of the liquid crystal layer are determined by generating the electric field in the liquid crystal layer 3, to control luminance of light passing through the liquid crystal layer.

A part of the peripheral area PA of the first display panel 100 may be exposed by the second display panel 200. A signal input pad to input the driving signals, such as the gate signal and the data signal, to the driving signal lines of the display area DA, and a driving circuit unit 550 to apply the driving signals to the driving signal lines, may be positioned in the peripheral area PA. An edge common voltage line 302 and a first common voltage transfer line 77 connected with the edge common voltage line 302 are also positioned in the peripheral area PA.

At least one of the edge common voltage line 302 and the first common voltage transfer line 77 is formed along at least one side of the display area DA and may surround the display area DA. In detail, at least one of the edge common voltage line 302 and the first common voltage transfer line 77 may be a closed loop or a polygon, which surrounds all sides of the display area DA, as illustrated in FIG. 1 or 2. In the alternative, at least one of the edge common voltage line 302 and the first common voltage transfer line 77 may be an open curve or an open polygon, which opens along an upper side or a lower side of the display area DA. FIG. 1 or 2 illustrates the edge common voltage line 302 and the first common voltage transfer line 77 which are formed along edges of four sides of the display area DA, as an example.

The first common voltage transfer line 77 may be connected with input pads 75 positioned in the peripheral area PA of the first display panel 100. The input pads 75 may be exposed through a plurality of connection wirings 78. The connection wirings 78 are disposed along the first common voltage transfer line 77 positioned below the display area DA, at a regular distance, and may be connected with the first common voltage transfer line 77. The input pads 75 may receive a common voltage Vcom through a flexible printed circuit film (not illustrated) and the like, and may receive the common voltage Vcom from the driving circuit unit 550, as illustrated in FIG. 1 or 2.

The first common voltage transfer line 77 may be made of a conductive material having a low resistance, such as metal of copper and the like. The first common voltage transfer line 77 may include a single layer or a multilayer structure.

The edge common voltage line 302 is connected with the common voltage line 301 of the display area DA. In more detail, the edge common voltage line 302 may connect ends of the vertical portions or the horizontal portions of the common voltage line 301. The edge common voltage line 302 may be made of the same material as the common voltage line 301 and may be positioned in the same layer as the common voltage line 301. The edge common voltage line 302 is overlapped with at least a part of the first common voltage transfer line 77.

An insulating layer (not illustrated) may be interposed between the edge common voltage line 302 and the first common voltage transfer line 77. The edge common voltage line 302 may be electrically and/or physically connected with the first common voltage transfer line 77, through at least one contact hole 187 of the insulating layer. A plurality of contact holes 187 may be provided as illustrated in FIG. 1. In this case, the contact holes 187 may be arranged along the periphery of the display area DA and spaced apart from each other at a predetermined distance. In other embodiments, one contact hole 187 may be continuously formed along the periphery of the display area DA, as illustrated in FIG. 2. When the contact hole 187 is continuously formed along the periphery of the display area DA, contact resistance may be lowered and a width of the contact hole 187 may be reduced. However, unlike FIG. 2, at least a part of the contact hole 187 formed along the periphery of the display area DA may be disconnected to form the contact holes 187.

According to another exemplary embodiment of the present invention, the edge common voltage line 302 may directly contact the first common voltage transfer line 77, directly above or below the first common voltage transfer line 77, so as to be electrically connected with the first common voltage transfer line 77. That is, the edge common voltage line 302 may be directly connected with the first common voltage transfer line 77, without passing through the contact hole 187.

According to another exemplary embodiment of the present invention, the common voltage line 301 may be directly electrically connected with the first common voltage transfer line 77, without passing through the edge common voltage line 302. That is, the common voltage line 301 may be positioned in the same layer as the first common voltage transfer line 77, so as to be directly connected with each other.

As described above, the edge common voltage line 302 is connected with the common voltage line 301 of the display area DA and receives the common voltage from the first common voltage transfer line 77 formed along the edges of at least three sides of the display area DA. As a result, the magnitudes of the common voltages may be uniform according to position. Further, the edge common voltage line 302 is made of metal having high conductivity and contacts the first common voltage transfer line 77 to receive the common voltage. As a result, the contact resistance may be lowered and a signal delay of the common voltage may be reduced. Since the contact resistance between the edge common voltage line 302 and the first common voltage transfer line 77 is lowered, widths of the edge common voltage line 302 and the first common voltage transfer line 77 may be decreased. Furthermore, the area of the peripheral area PA may be decreased. Accordingly, in the case of a display device in which a driving circuit is integrated in the peripheral area PA, an area of a signal wiring connected to the integrated driving circuit may be sufficiently secured. As a result, the resistance of the signal wiring may be decreased and the degree of design freedom in the peripheral area PA may be increased.

Figure 3:
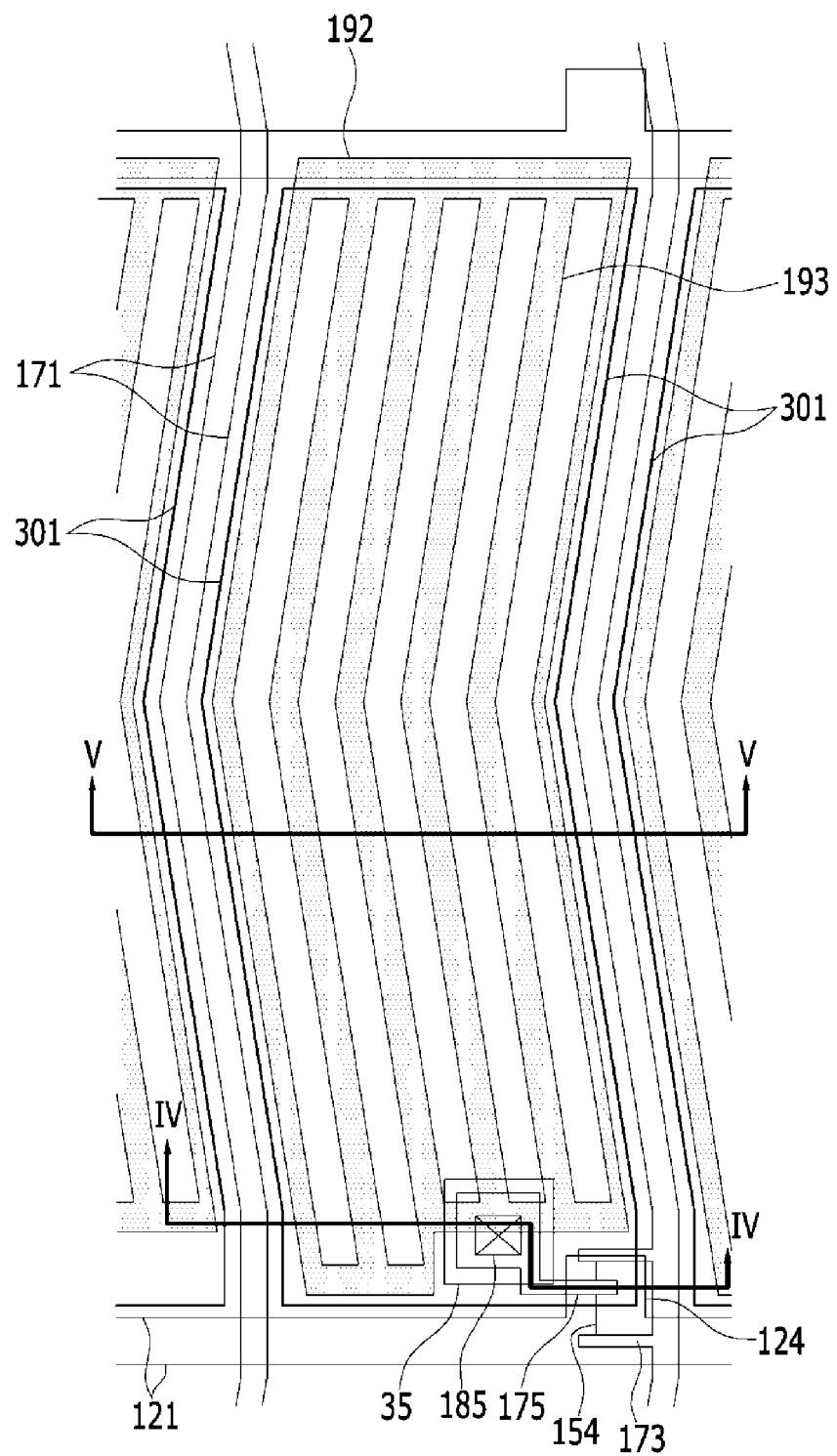
FIG. 3 is a layout view of one pixel of a display device according to an exemplary embodiment of the present invention.
Figure 4:
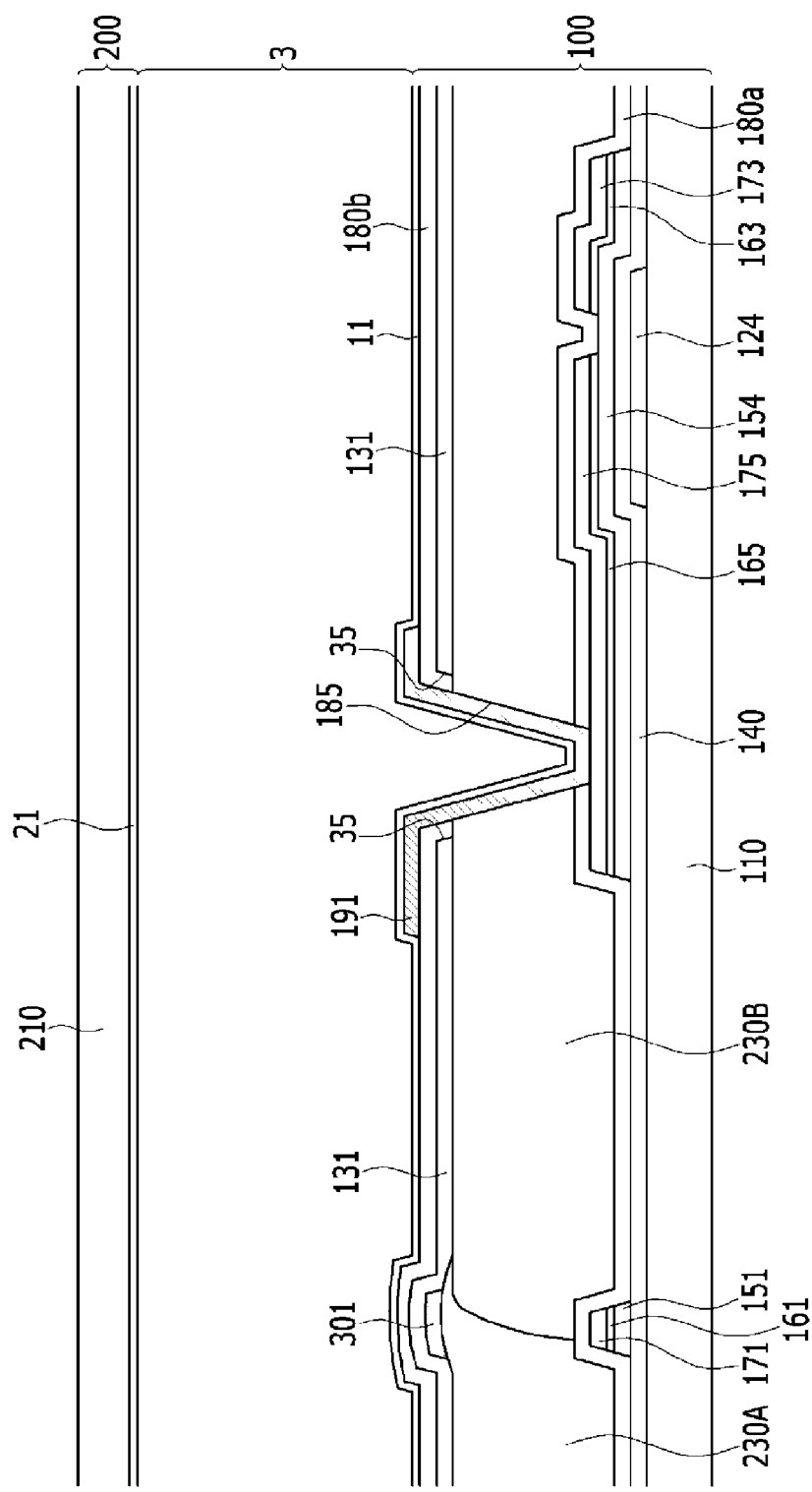
FIG. 4 is a cross-sectional view of the display device of FIG. 3, taken along line IV-IV.
Figure 5:
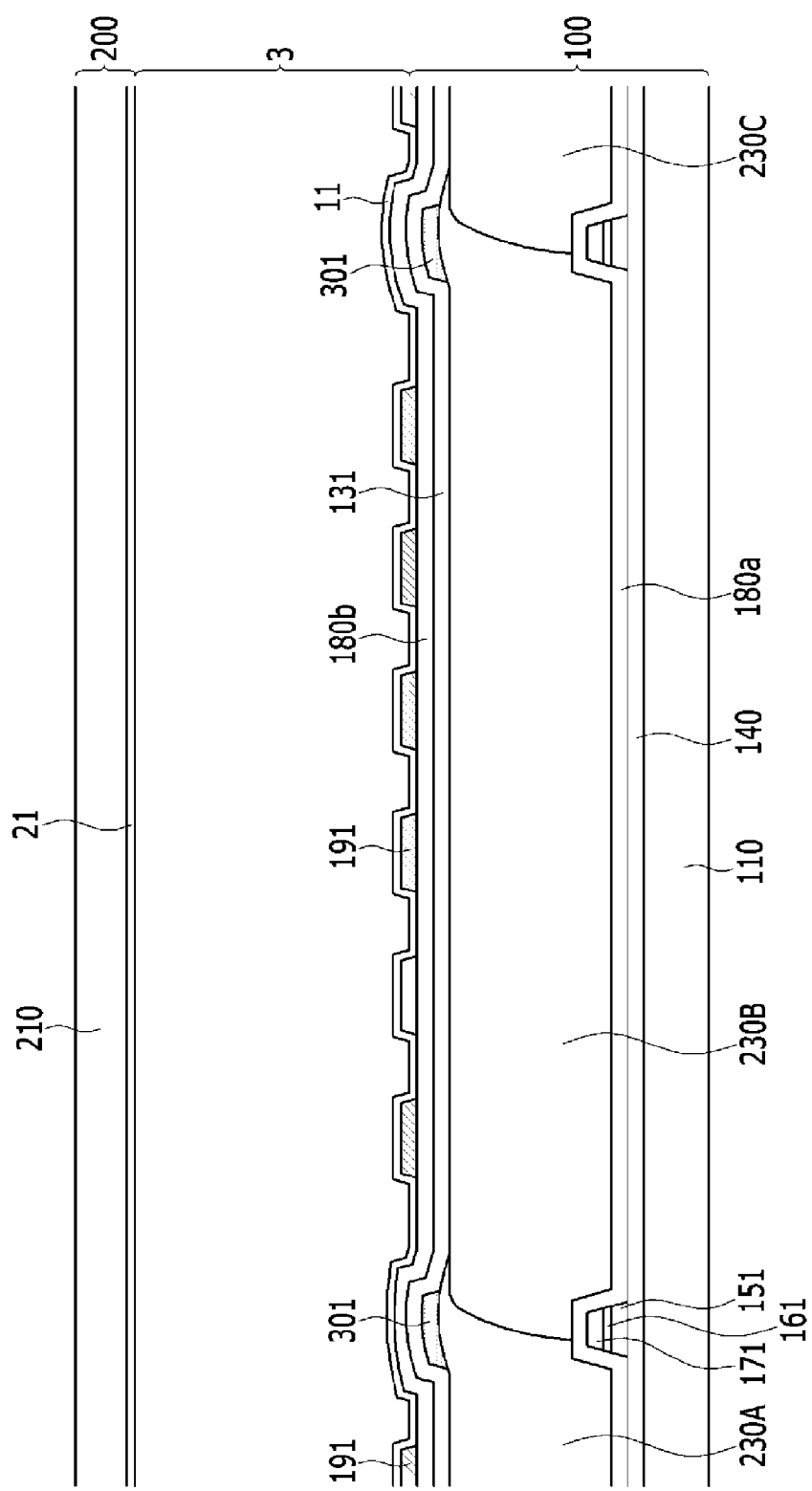
FIG. 5 is a cross-sectional view of the display device of FIG. 3, taken along line V-V.
Figure 6:
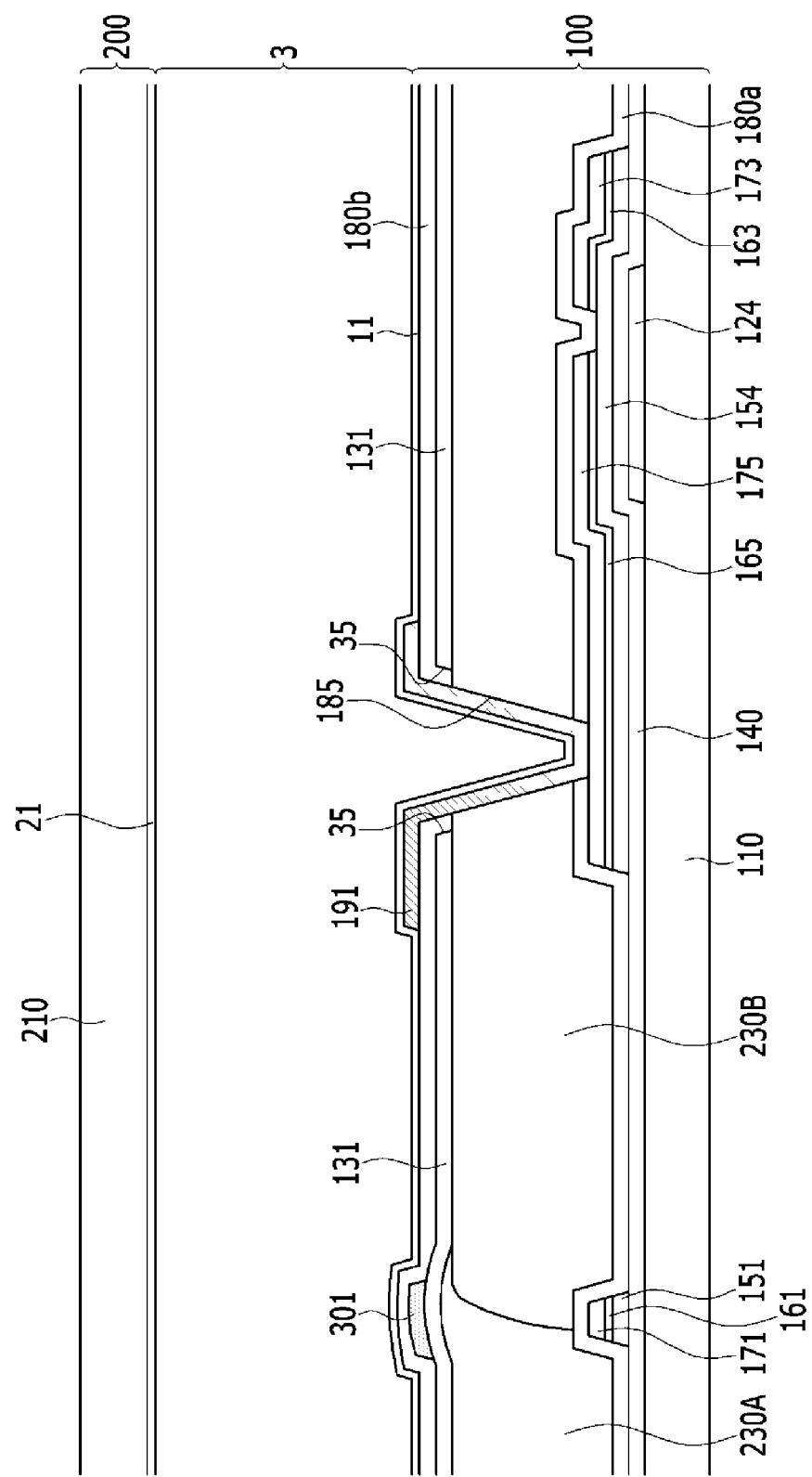
FIG. 6 is another example of a cross-sectional view of the display device of FIG. 3, taken along line IV-IV.
Figure 7:
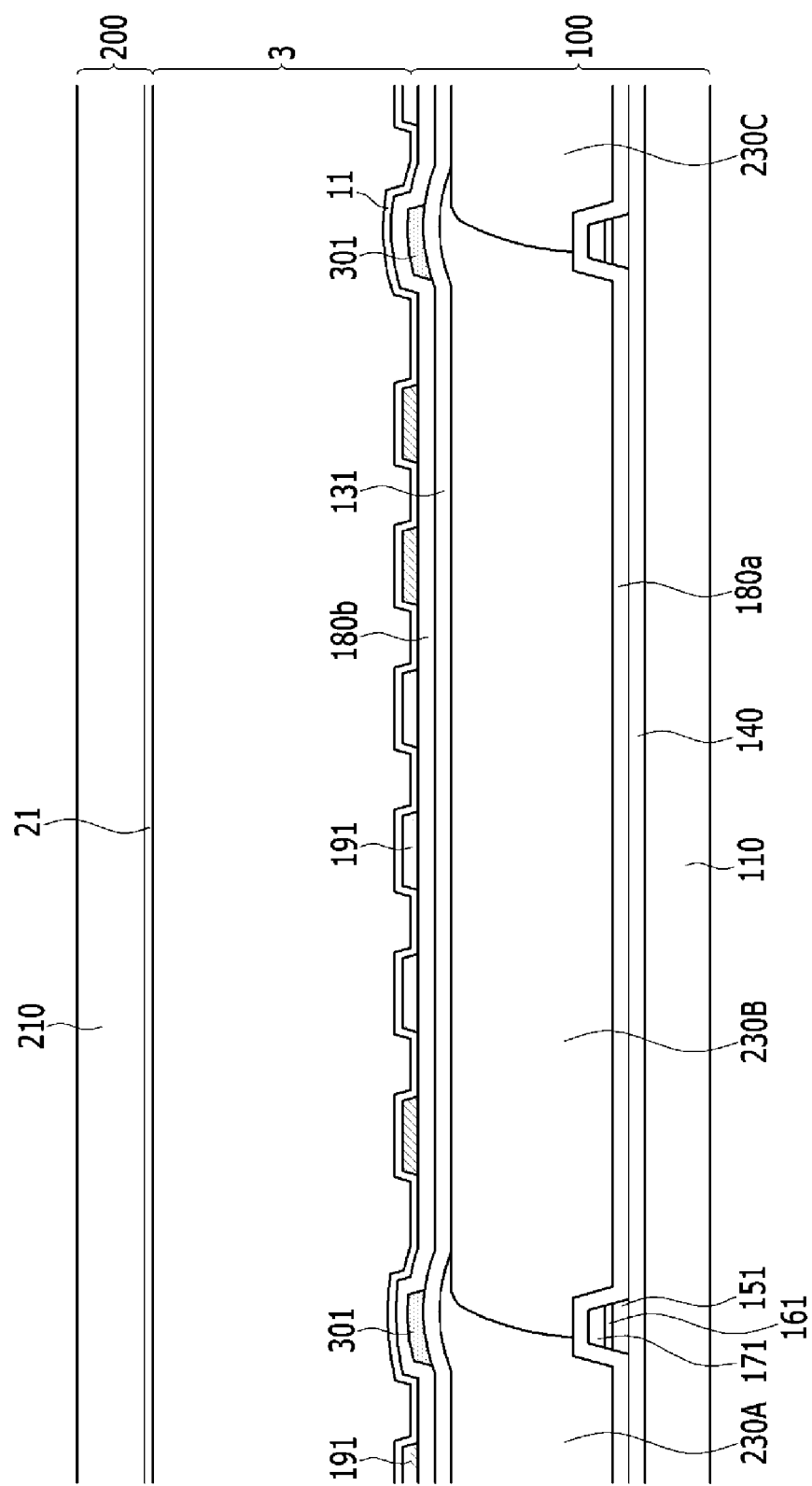
FIG. 7 is another example of a cross-sectional view of the display device of FIG. 3, taken along line V-V.

FIG. 3 is a layout view of one pixel of a display device according to an exemplary embodiment of the present invention, FIG. 4 is a cross-sectional view of the display device of FIG. 3 taken along line IV-IV, FIG. 5 is a cross-sectional view of the display device of FIG. 3 taken along line V-V, FIG. 6 is another example of a cross-sectional view of the display device of FIG. 3, taken along line IV-IV, and FIG. 7 is another example of a cross-sectional view of the display device of FIG. 3, taken along line V-V.

The display device includes a first display panel 100 and a second display panel 200 facing each other, and a liquid crystal layer 3 interposed between the two display panels 100 and 200. In the first display panel 100, gate lines 121 including a plurality of gate electrodes 124 are positioned on an insulation substrate 110. The gate lines 121 transfer gate signals and extend mainly in a horizontal direction (row direction).

A gate insulating layer 140 is formed on the gate line 121, and semiconductors 151 are positioned thereon. The semiconductors 151 each include a protrusion 154 positioned on the gate electrode 124.

Ohmic contacts 161, 163, and 165 made of a material such as n+ hydrogenated amorphous silicon, in which n-type impurity such as phosphorus is doped at high concentration, or a silicide, may be positioned on the semiconductor 151. The ohmic contacts 161, 163, and 165 may be omitted.

A data conductor including a plurality of data lines 171 and a plurality of drain electrodes 175 is positioned on the ohmic contacts 161, 163, and 165. The data lines 171 transfer data signals and extend mainly in a vertical direction (column direction). Each data line 171 includes source electrodes 173 which extend toward the gate electrode 124. The drain electrode 175 faces the source electrode 173.

The gate electrode 124, the source electrode 173, and the drain electrode 175 form a thin film transistor (TFT) together with the semiconductor protrusion 154. A first passivation layer 180a is positioned on the thin film transistor, and a plurality of color filters 230A, 230B, and 230C may be positioned thereon. In the alternative, the color filters 230A, 230B, and 230C may be positioned on the second display panel 200.

A common voltage line 301 and a common electrode 131 are positioned on the color filters 230A, 230B, and 230C. The common voltage line 301 may include a horizontal portion which is parallel to the gate line 121 and a vertical portion which is parallel to the data line 171. The vertical portion and the horizontal portion are connected to each other. At least one of the horizontal portion and the vertical portion may be omitted. The common voltage line 301 may be made of a material having a high conductivity, such as a metal. Further, a width of the common voltage line 301 where overlapped with the data line 171 may be larger than or equal to that of the data line 171. According to another exemplary embodiment of the present invention, the common voltage line 301 may be made of a conductive organic material having a high electrical conductivity. In this case, the reflection of light may be prevented and an aperture ratio of the liquid crystal display may be increased.

The common electrode 131 directly contacts the common voltage line 301 on or below the common voltage line 301. FIGS. 4 and 5 illustrate an example in which the common electrode 131 is positioned on the common voltage line 301, and FIGS. 6 and 7 illustrate an example in which the common electrode 131 is positioned below the common voltage line 301. The common electrode 131 may be made of a transparent conductive material such as ITO or IZO. The common electrode 131 may be a planar structure formed on the entire surface of the insulation substrate 110 and may have an opening 35 in a region corresponding to the drain electrode 175.

A second passivation layer 180b is positioned on the common voltage line 301 and the common electrode 131, and a pixel electrode 191 is positioned thereon. The pixel electrode 191 includes branch electrodes 193 that extend substantially parallel to each other and are spaced apart from each other. The pixel electrode 191 includes lower and upper horizontal portions 192 connecting upper and lower ends of the branch electrodes 193. The branch electrodes 193 of the pixel electrode 191 may be curved along the data line 171. However, according to another exemplary embodiment of the present invention, the data line 171 and the branch electrodes 193 may extend in a straight line. The pixel electrode 191 may be made of a transparent conductive material such as ITO or IZO.

Contact holes 185 exposing the drain electrodes 175 are formed in the first passivation layer 180a, the second passivation layer 180b, and the color filters 230A, 230B, and 230C. Edges 35 of the common electrode 131 may expose portions of the color filters 230A, 230B, and 230C adjacent to the contact holes 185. The pixel electrode 191 is electrically connected with the drain electrode 175 through the contact hole 185 to receive the data voltage.

A first alignment layer 11 is coated on an inner surface of the first display panel 100. A second alignment layer 21 is coated on an insulation substrate 210 of the second display panel 200. The first alignment layer 11 and the second alignment layer 21 may be horizontal alignment layers.

The liquid crystal layer 3 interposed between the first display panel 100 and the second display panel 200 includes liquid crystal molecules (not illustrated). The liquid crystal molecules may be aligned so that long axes thereof are horizontal to the surfaces of the display panels 100 and 200 when an electric field is not applied. The liquid crystal layer 3 may have positive dielectric anisotropy or may have negative dielectric anisotropy. The liquid crystal molecules of the liquid crystal layer 3 may be pretilted in one or more directions, according to the dielectric anisotropy of the liquid crystal layer 3.

The pixel electrode 191 receives the data voltage and the common electrode 131 receives the common voltage, to generate an electric field in the liquid crystal layer 3. The electric field aligns the liquid crystal molecules to display an image. Since an effect regarding the common voltage line 301 is described in the exemplary embodiment described above, a detailed description thereof is omitted.

Figure 8:
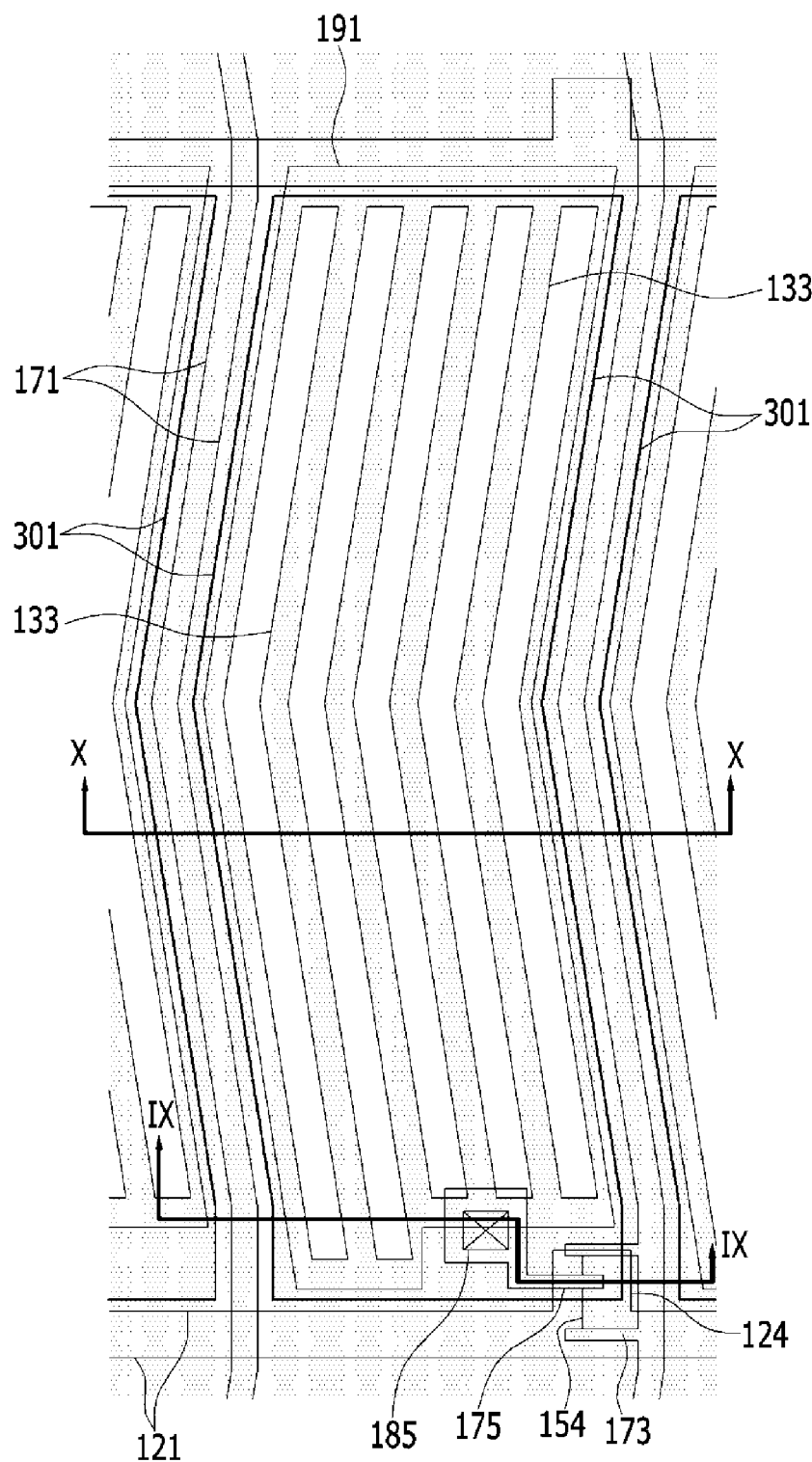
FIG. 8 is a layout view of one pixel of a display device according to an exemplary embodiment of the present invention.
Figure 9:
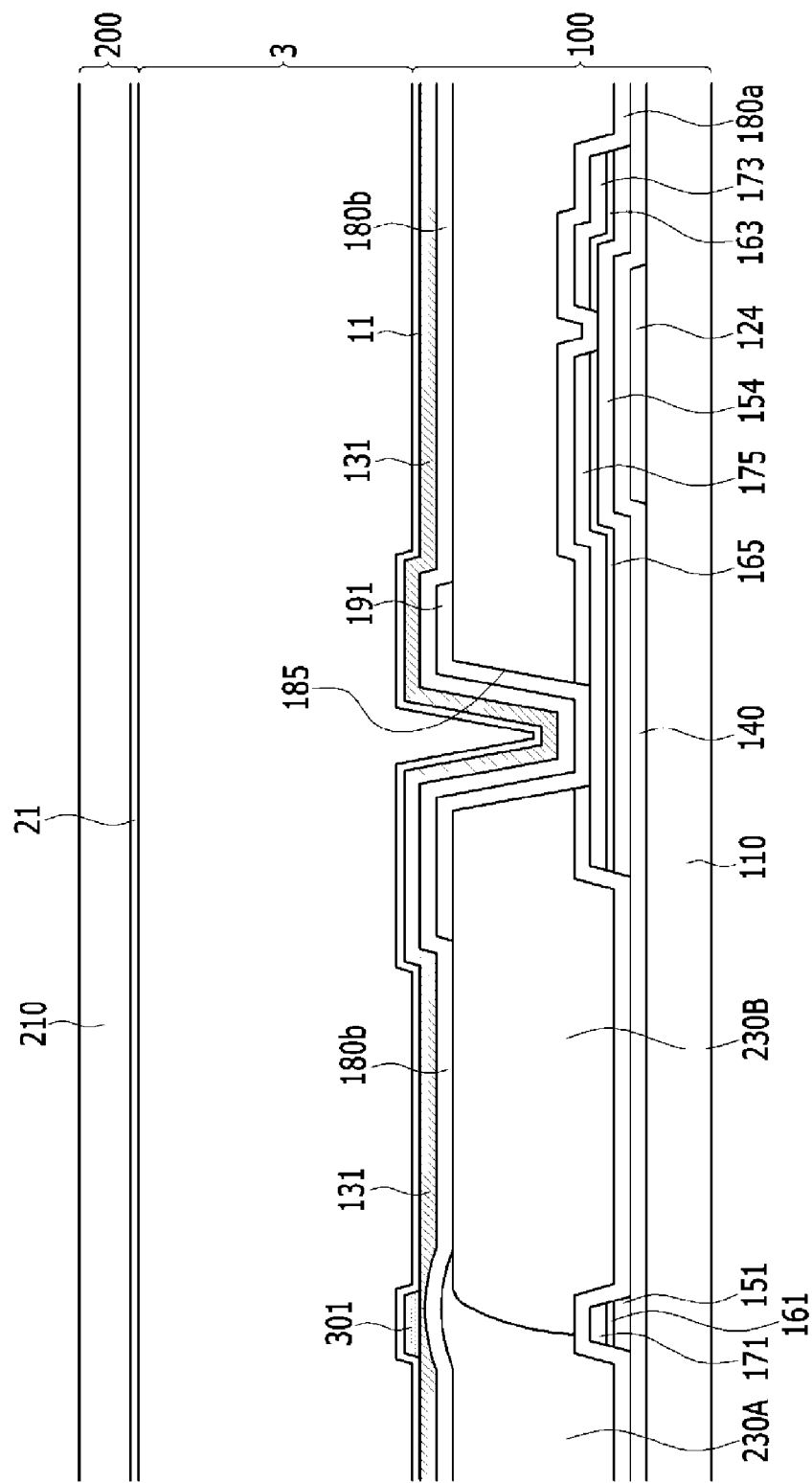
FIG. 9 is a cross-sectional view of the display device of FIG. 8, taken along line IX-IX.
Figure 10:
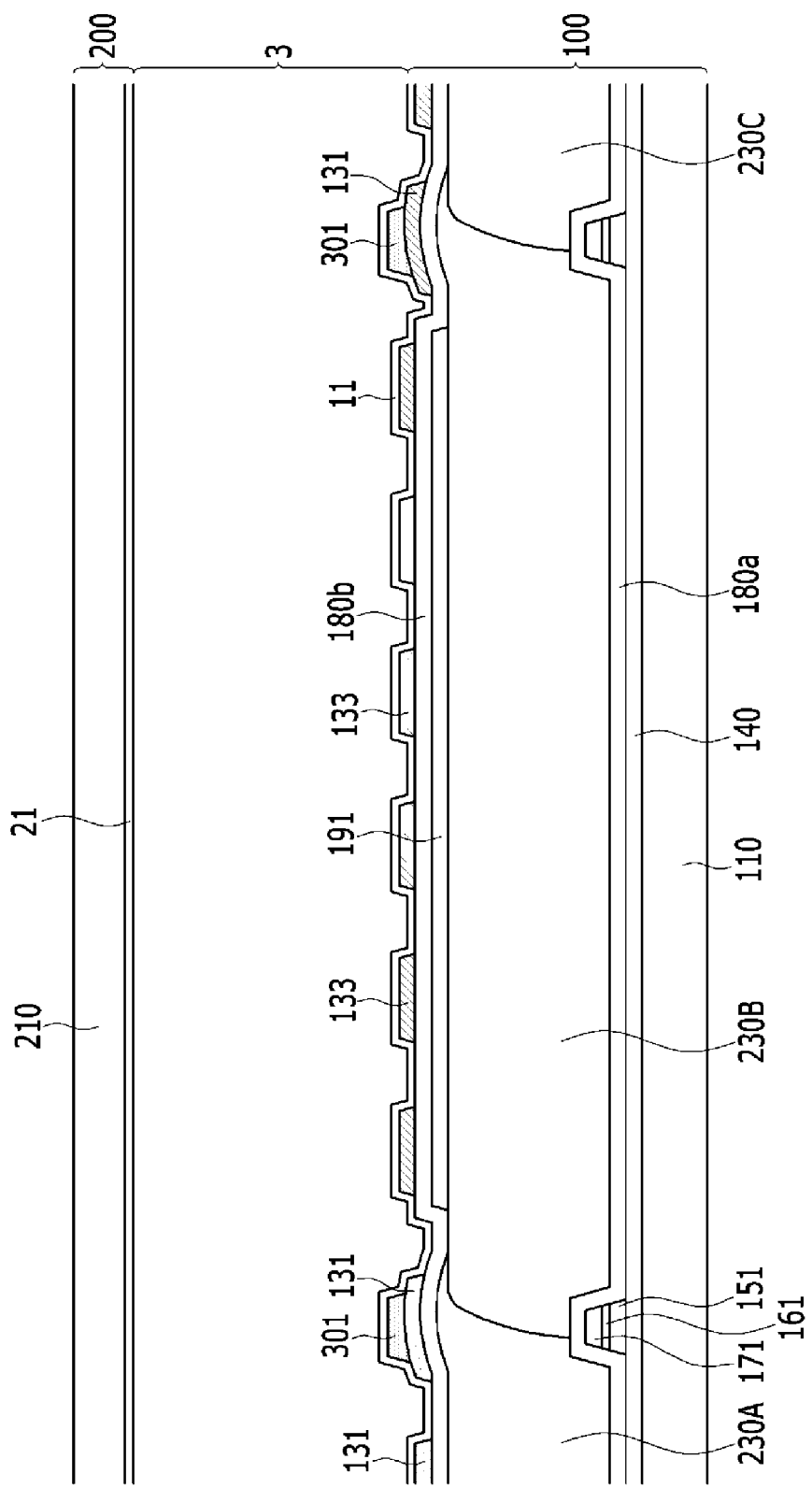
FIG. 10 is a cross-sectional view of the display device of FIG. 8, taken along line X-X.

FIG. 8 is a layout view of one pixel of a display device according to an exemplary embodiment of the present invention, FIG. 9 is a cross-sectional view of the display device of FIG. 8, taken along line IX-IX, and FIG. 10 is a cross-sectional view of the display device of FIG. 8, taken along line X-X. The display device is a liquid crystal display similar to the exemplary embodiment illustrated in FIGS. 3 to 7 described above, except that a vertical position of the pixel electrode 191 and the common electrode 131 are reversed.

In detail, pixel electrodes 191 are positioned on the color filters 230A, 230B, and 230C. The pixel electrodes 191 may be a planar shape that almost fills a region surrounded by the gate line 121 and the data line 171. The overall shape of the pixel electrode 191 may generally be a polygon having sides that are substantially parallel to the gate line 121 and the data line 171. The pixel electrode 191 may be made of a transparent conductive material such as ITO or IZO.

Contact holes 185 exposing the drain electrode 175 are formed in the first passivation layer 180a and the color filter 230A. The pixel electrode 191 is electrically connected with the drain electrode 175 through the contact hole 185, to receive a data voltage.

A second passivation layer 180b is positioned on the color filters 230A, 230B, and 230C and the pixel electrode 191, and the common electrode 131 is positioned thereon. The common electrode 131 may be made of a transparent conductive material such as ITO or IZO. The common electrode 131 includes branch electrodes 133 overlapped with respective pixel electrodes 191. The branch electrodes 133 may be substantially parallel to each other and may be curved along with the data line 171. However, according to another exemplary embodiment of the present invention, the data line 171 and the branch electrodes 133 may extend in a straight line.

A common voltage line 301 which directly contacts the common electrode 131 is positioned on or below the common electrode 131. FIGS. 9 and 10 illustrate an example in which the common voltage line 301 is positioned on the common electrode 131. Since the feature of the common voltage line 301 is similar to that of the exemplary embodiment illustrated in FIGS. 3 to 7, a detailed description thereof is omitted.

Figure 11:
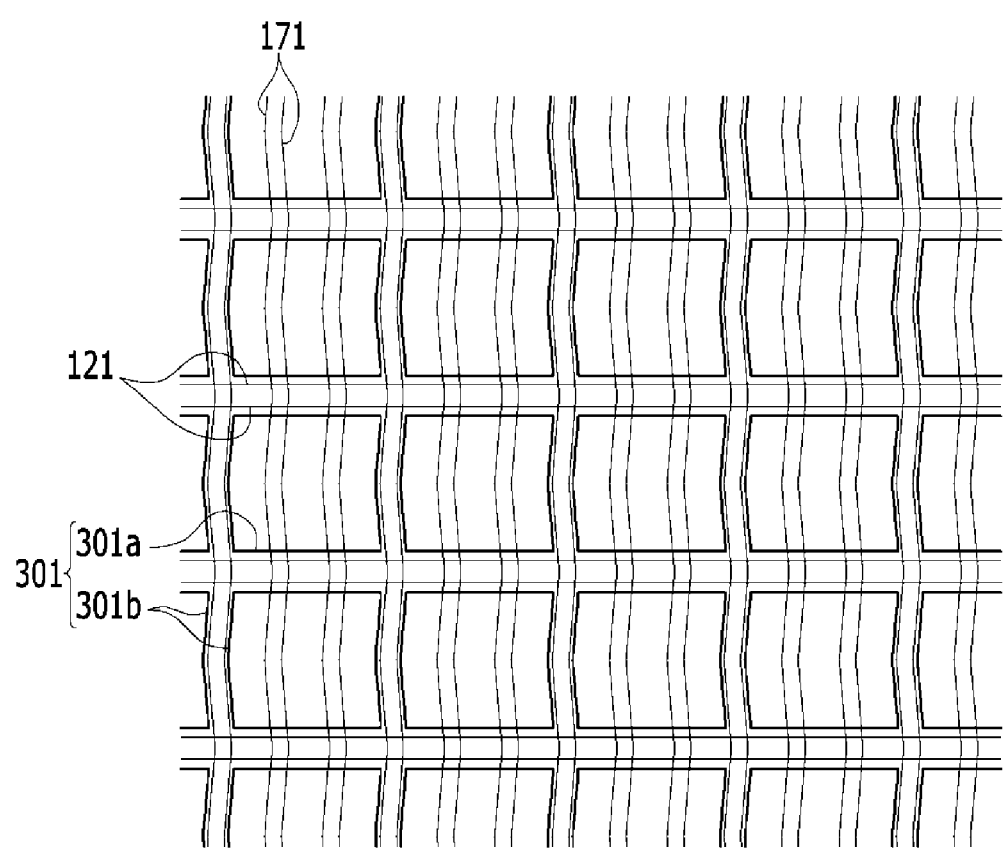
FIG. 11 is a layout view of a signal line of a display device according to an exemplary embodiment of the present invention.

FIG. 11 is a layout view of a signal line of a display device according to an exemplary embodiment of the present invention. Referring to FIG. 11, a data line 171 may be curved at least once between two adjacent gate lines 121. A common voltage line 301 may have horizontal portions 301a overlapped with gate lines 121, and vertical portions 301b overlapped with data lines 171. In FIG. 11, the horizontal portions 301a of the common voltage line 301 are overlapped with all the gate lines 121, but may be disposed one by one every two or more gate lines 121. Further, in FIG. 11, the vertical portions 301b of the common voltage line 301 are disposed one by one every three adjacent data lines 171, but may be disposed to be overlapped with all the data lines 171 and may be disposed by other numbers of data lines 171.

According to another exemplary embodiment of the present invention, any one of the horizontal portion 301a and the vertical portion 301b of the common voltage line 301 may be omitted. In addition, a layout of the common voltage line 301 is not limited thereto and may be variously changed.

Hereinafter, a detailed structure of a peripheral area PA of a display device according to an exemplary embodiment of the present invention will be described with reference to FIGS. 12 to 19 together with the drawings described above. The same reference numerals designate the same constituent elements as the exemplary embodiments described above and the duplicated description is omitted, but differences will be mainly described.

FIGS. 12 to 19 are cross-sectional views of the display device of FIG. 1 or 2, taken along line A-A'. First, referring to FIGS. 12 and 13, the first common voltage transfer line 77 is positioned on the insulation substrate 110. Accordingly, the first common voltage transfer line 77 may be positioned in the same layer as the gate line 121 and may include the same material as the gate line 121.

Figure 12:
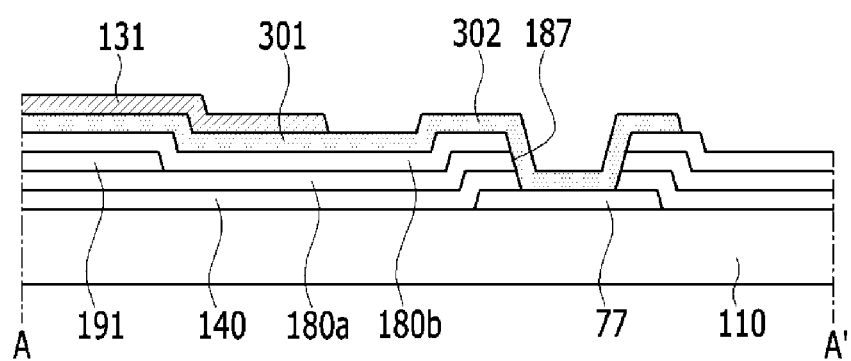
FIGS. 12 to 19 are cross-sectional views of the display device of FIG. 1 or 2, taken along line A-A', respectively.
Figure 13:
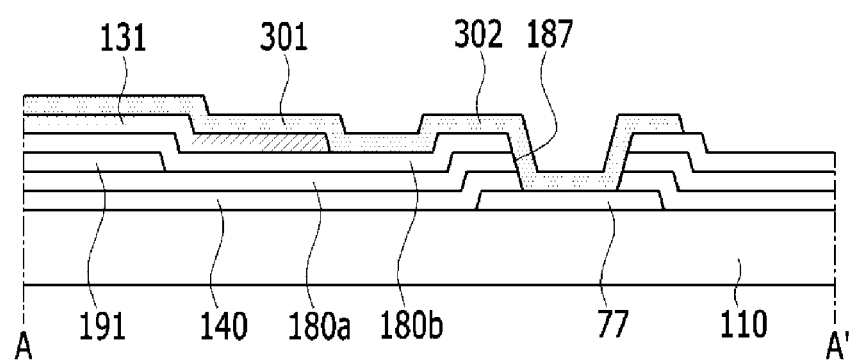

The gate insulating layer 140 and the first passivation layer 181a are sequentially positioned on the first common voltage transfer line 77. The pixel electrode 191 and the common electrode 131 are positioned on the passivation layer 180a, with the second passivation layer 180b disposed therebetween. FIGS. 12 and 13 illustrate an example in which the pixel electrode 191 is positioned on the first passivation layer 180a, and the common electrode 131 is positioned thereon. However, the common electrode 131 may be positioned on the first passivation layer 180a, and the pixel electrode 191 may be positioned thereon. In any case, the common electrode 131 and/or the pixel electrode 191 may include branch electrodes overlapped with an electrode positioned there below.

The common voltage line 301 directly contacts the common electrode 131. The edge common voltage lines 302 and the common voltage line 301 are positioned on or below the common electrode 131. FIG. 12 illustrates an example in which the common voltage line 301 and the edge common voltage line 302 are positioned below the common electrode 131. FIG. 13 illustrates an example in which the common voltage line 301 and the edge common voltage line 302 are positioned on the common electrode 131.

According to the exemplary embodiment, the common voltage line 301 positioned in the display area DA and the edge common voltage line 302 positioned in the peripheral area PA are positioned in the same layer as each other and are connected to each other.

The gate insulating layer 140, the first passivation layer 180a, and the second passivation layer 180b include a contact hole 187 exposing the first common voltage transfer line 77. The edge common voltage line 302 contacts the first common voltage transfer line 77 through the contact hole 187 to receive a common voltage. The contact hole 187 may not expose the side surface of the first common voltage transfer line 77, but may expose the upper side thereof. In this case, with respect to the first common voltage transfer line 77 of a predetermined region, the area of the upper side of the first common voltage transfer line 77, which is not exposed by the contact hole 187, may be approximately 50% or less of the entire area of the upper side of the first common voltage transfer line 77. Furthermore, the contact hole 187 may expose the entire upper side of the first common voltage transfer line 77. The shape of the contact hole 187 may be the same as that of the exemplary embodiment illustrated in FIG. 1 or 2 described above.

Figure 14:
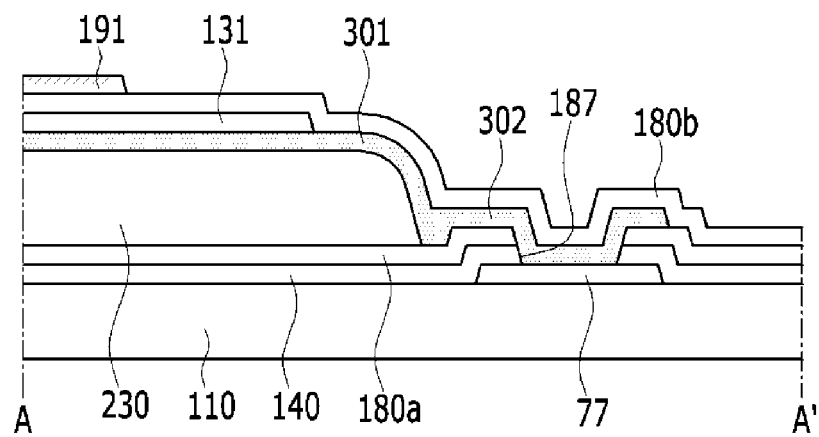
Figure 15:
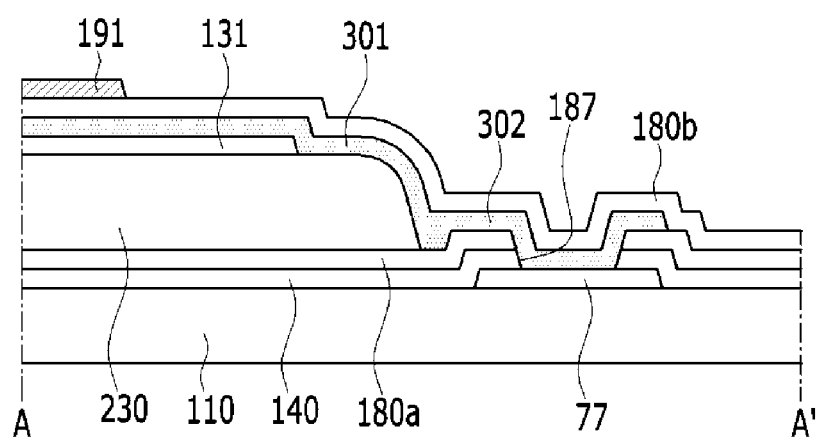

Referring to FIGS. 14 and 15, the first common voltage transfer line 77 is positioned on the insulation substrate 110, and the gate insulating layer 140 and the first passivation layer 180a are sequentially positioned thereon. The color filter 230 may be positioned on the first passivation layer 180a. According to another exemplary embodiment of the present invention, an organic layer (not illustrated) made of an organic insulating material may be substituted for the color filter 230.

The pixel electrode 191 and the common electrode 131 are positioned on the color filter 230 with the second passivation layer 180b disposed therebetween. FIGS. 14 and 15 illustrate an example in which the common electrode 131 is positioned on the color filter 230, and the pixel electrode 191 is positioned thereon. However, the pixel electrode 191 may be positioned on the color filter 230, and the common electrode 131 may be positioned thereon.

The common voltage line 301 and the edge common voltage line 302 are positioned on or below the common electrode 131. FIG. 14 illustrates an example in which the common voltage line 301 and the edge common voltage line 302 are positioned below the common electrode 131. FIG. 15 illustrates an example in which the common voltage line 301 and the edge common voltage line 302 are positioned on the common electrode 131.

The gate insulating layer 140 and the first passivation layer 180a include a contact hole 187 exposing the first common voltage transfer line 77. The edge common voltage line 302 s contacts the first common voltage transfer line 77 through the contact hole 187, to receive a common voltage. The shape of the contact hole 187 may be as described above. The second passivation layer 180b may be positioned on the edge common voltage line 302.

Figure 16:
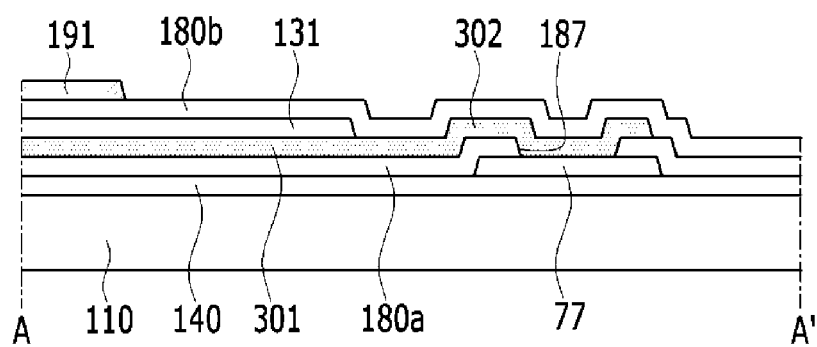

Referring to FIG. 16, the gate insulating layer 140 is positioned on the insulation substrate 110, and the first common voltage transfer line 77 is positioned thereon. Accordingly, the first common voltage transfer line 77 may be positioned in the same layer as the data line 171 and may include the same material as the data line 171.

The first passivation layer 181a is positioned on the first common voltage transfer line 77, and the pixel electrode 191 and the common electrode 131 are positioned thereon with the second passivation layer 180b disposed therebetween. FIG. 16 illustrates an example in which the common electrode 131 is positioned on the first passivation layer 180a, and the pixel electrode 191 is positioned thereon. However, the pixel electrode 191 may be positioned on the first passivation layer 180a, and the common electrode 131 may be positioned thereon.

The common voltage line 301 and the edge common voltage line 302 are positioned on or below the common electrode 131. FIG. 16 illustrates an example in which the common voltage line 301 and the edge common voltage line 302 are positioned below the common electrode 131.

The common voltage line 301 is positioned in the display area DA and the edge common voltage line 302 is positioned in the peripheral area PA. The common voltage line 301 and the edge common voltage line 302 are positioned in the same layer and are connected to each other.

The first passivation layer 180a includes a contact hole 187 exposing the first common voltage transfer line 77. The edge common voltage line 302 contacts the first common voltage transfer line 77 through the contact hole 187, to receive a common voltage. The shape of the contact hole 187 may be as described above. The second passivation layer 180b may be positioned on the edge common voltage line 302.

Figure 17:
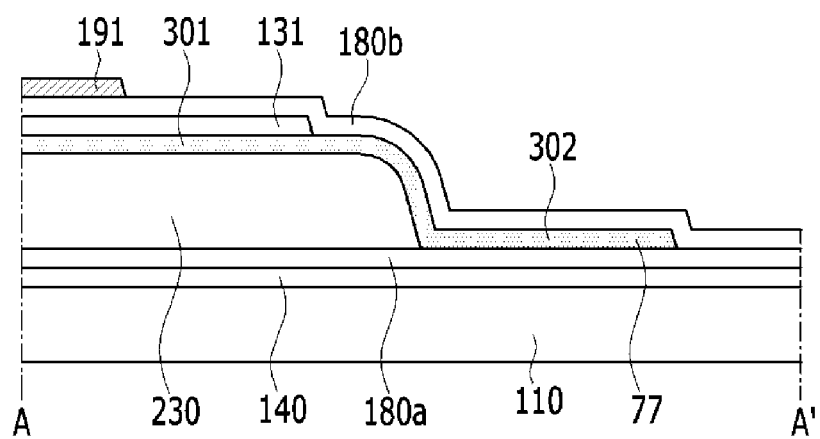

Referring to FIG. 17, the gate insulating layer 140 and the first passivation layer 180a may be sequentially positioned on the insulation substrate 110, and the color filter 230 may be positioned thereon. However, the color filter 230 may be replaced with another organic layer and/or may be omitted.

The common voltage line 301, the edge common voltage line 302, and the first common voltage transfer line 77 are positioned on the color filter 230. According to the exemplary embodiment, the edge common voltage line 302 of the peripheral area PA is directly connected with the first common voltage transfer line 77 and is positioned in the same layer as the first common voltage transfer line 77. That is, the common voltage line 301, the edge common voltage line 302, and the first common voltage transfer line 77 may be positioned in the same layer.

The pixel electrode 191 and the common electrode 131 are positioned on the common voltage line 301 and the first common voltage transfer line 77, with the second passivation layer 180b disposed therebetween. FIG. 17 illustrates an example in which the pixel electrode 191 is positioned on the common electrode 131. In this case, the common voltage line 301 may directly contact the common electrode 131 there below. However, the common voltage line 301 may directly contact the common electrode 131 on the common electrode 131. Further, unlike FIG. 17, the pixel electrode 191 may be positioned below the common electrode 131 and the common voltage line 301. The second passivation layer 180b may be positioned on the first common voltage transfer line 77.

Figure 18:
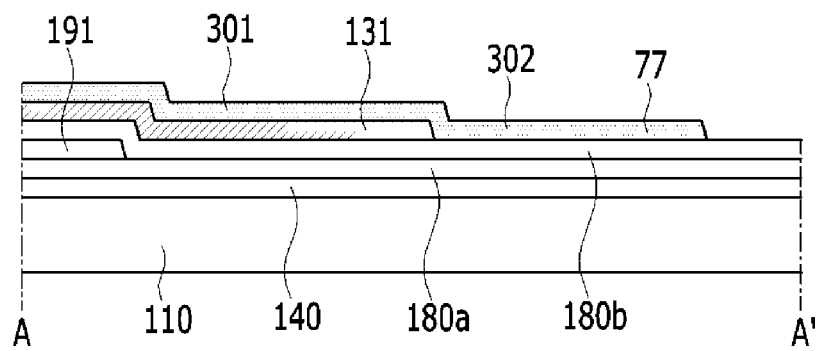

Next, referring to FIG. 18, the gate insulating layer 140 and the first passivation layer 180a are sequentially positioned on the insulation substrate 110, and the pixel electrode 191 and the common electrode 131 are positioned thereon with the second passivation layer 180b disposed therebetween. FIG. 18 illustrates an example in which the pixel electrode 191 is positioned below the common electrode 131. However, the pixel electrode 191 may be positioned on the common electrode 131.

The common voltage line 301 and the first common voltage transfer line 77 are positioned on or below the common electrode 131. FIG. 18 illustrates an example in which the common voltage line 301 is positioned on the common electrode 131. The edge common voltage line 302 of the peripheral area PA is directly connected with the first common voltage transfer line 77 and positioned in the same layer as the first common voltage transfer line 77. That is, the common voltage line 301, the edge common voltage line 302, and the first common voltage transfer line 77 may be positioned in the same layer. The second passivation layer 180b may be positioned below the first common voltage transfer line 77.

According to the exemplary embodiment illustrated in FIGS. 17 and 18, it is not necessary to form the gate insulating layer 140 in the peripheral area PA, and the contact hole of the first passivation layer 180a, and/or the second passivation layer 180b may also be omitted. Accordingly, contact resistance due to the contact hole in the peripheral area PA may be decreased, and the width of the first common voltage transfer line 77 may be minimized, thereby reducing the area of the peripheral area PA.

Figure 19:
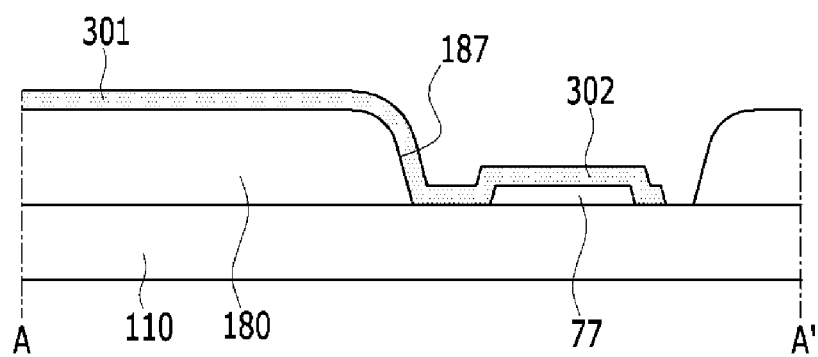

Referring to FIG. 19, the first common voltage transfer line 77 is positioned on the insulation substrate 110, and a passivation layer 180 including an organic insulating material or an inorganic insulating material is positioned thereon. The passivation layer 180 may include a contact hole 187 fully exposing the first common voltage transfer line 77, unlike the exemplary embodiment illustrated in FIGS. 1 and 2 described above. That is, the contact hole 187 fully exposes the first common voltage transfer line 77 in a width direction and may expose the side surface of the first common voltage transfer line 77.

The common voltage line 301 and the edge common voltage line 302 connected thereto are positioned on the passivation layer 180. The common voltage line 301 positioned in the display area DA and the edge common voltage line 302 positioned in the peripheral area PA are positioned in the same layer and are connected to each other. The edge common voltage line 302 contacts the first common voltage transfer line 77 through the contact hole 187, to receive a common voltage.

The width of the contact hole 187 is larger than the width of the first common voltage transfer line 77. Therefore, the contact resistance between the edge common voltage line 302 and the first common voltage transfer line 77 may be decreased, and the width of the first common voltage transfer line 77 may be minimized, thereby reducing the area of the peripheral area PA of the first display panel 100.

In FIG. 19, the passivation layer 180 may include at least one of the gate insulating layer 140, the first passivation layer 180a, and the second passivation layer 180b described above. At least one of the gate insulating layer 140 and the first passivation layer 181a may be positioned below the first common voltage transfer line 77. Further, the gate insulating layer 140 may or may not be positioned on the common voltage line 301. When the gate insulating layer 140 is positioned on the common voltage line 301, the second passivation layer 180b may be disposed thereon.

Figure 20:
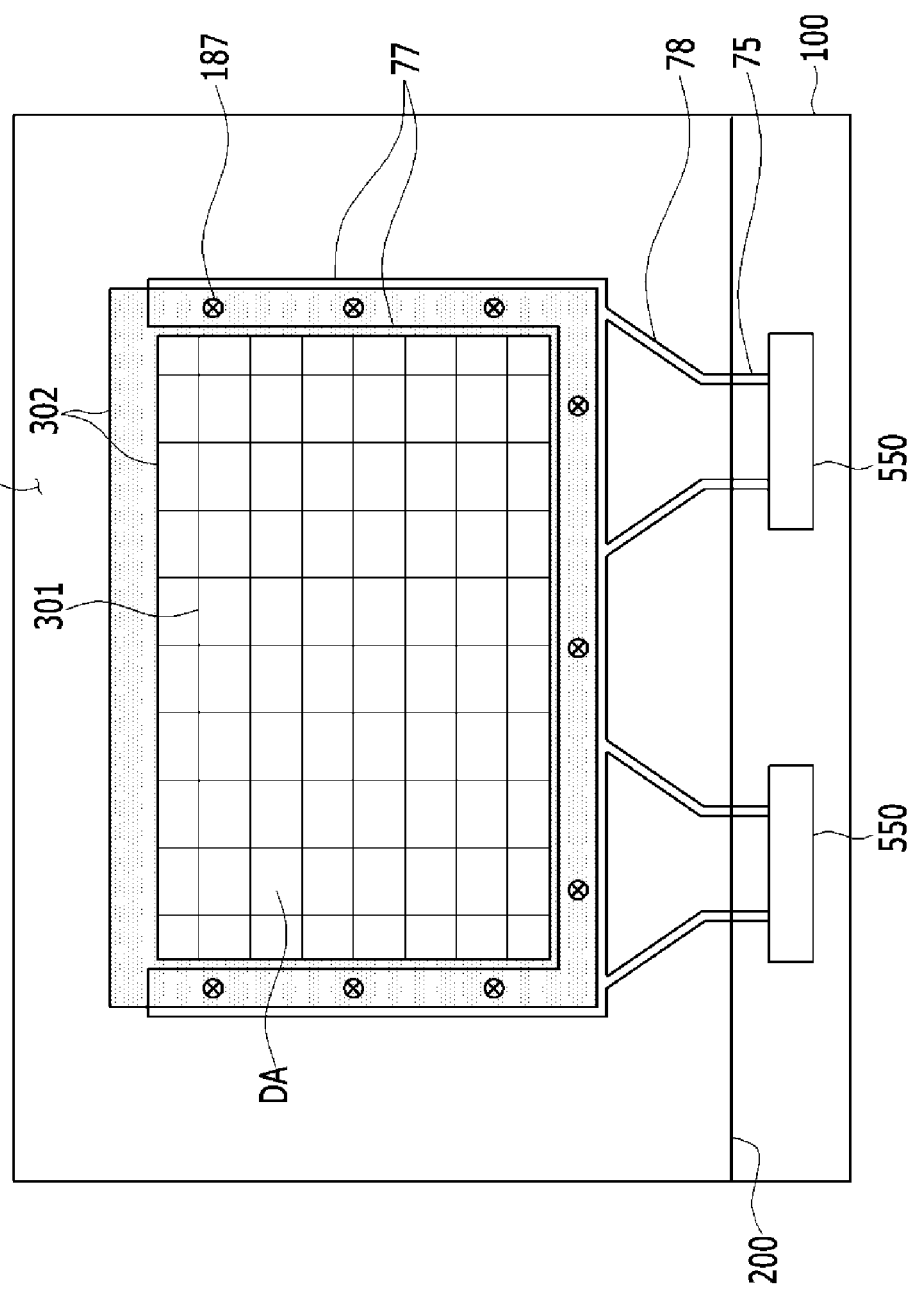
FIGS. 20 to 25 are plan views of a display device according to an exemplary embodiment of the present invention, respectively.
Figure 21:
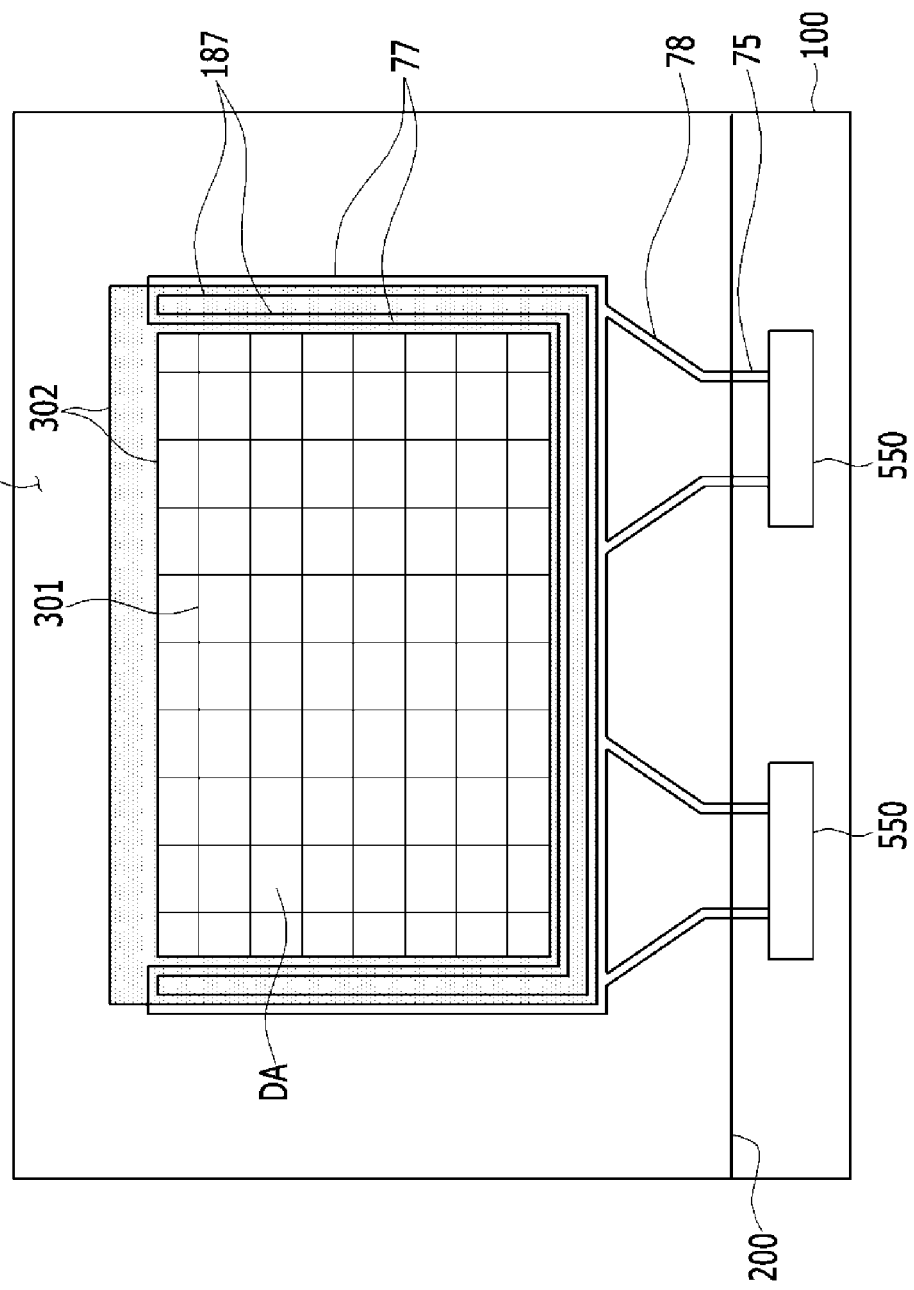

FIGS. 20 to 23 are plan views of display devices according to exemplary embodiments of the present invention. Since the display devices are similar to the display devices described above, only the differences therebetween will be described in detail. Referring to FIG. 20 or 21, the common electrode 131 is not illustrated for convenience, but has the same features as described above.

According to the exemplary embodiments, at least one of the edge common voltage line 302 and the first common voltage transfer line 77 may be formed along edges of three sides of the display area DA. That is, at least one of the edge common voltage line 302 and the first common voltage transfer line 77 may be an open curve or an open polygon that is not formed along an upper side or a lower side of the display area DA. FIGS. 20 and 21 illustrate the first common voltage transfer line 77 formed along the edges of three sides of left, right, and lower sides of the display area DA, as an example. The edge common voltage line 302 may be formed along edges of four sides of the display area DA, as illustrated in FIGS. 20 and 21, and may be formed only at the edges of three sides like the first common voltage transfer line 77.

Figure 22:
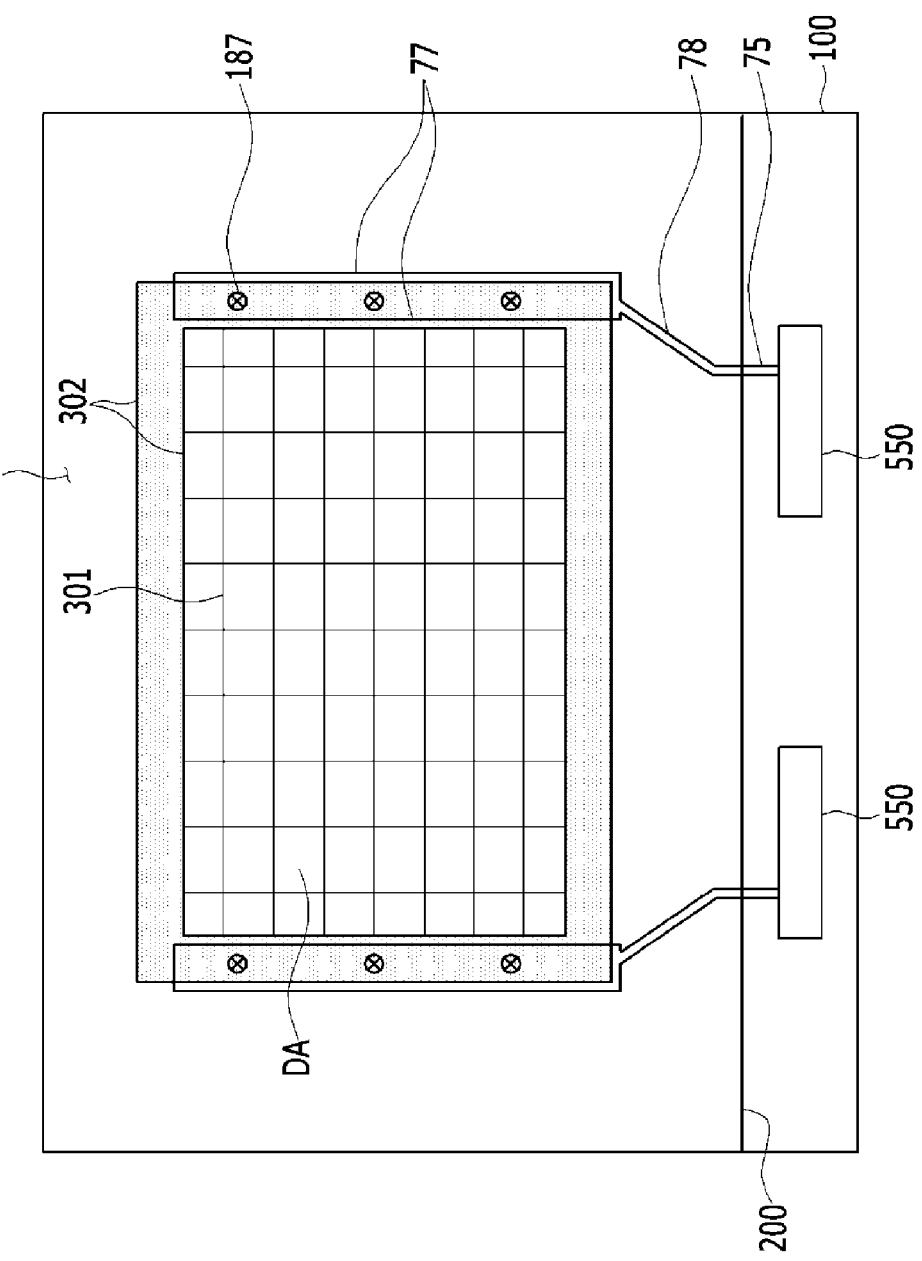

Next, referring to FIG. 22, an example display device is illustrated in which the first common voltage transfer line 77 is formed along edges of two opposing sides of the display area DA. That is, the first common voltage transfer line 77 may include two opposing portions that extend along left and right edges of the display area DA. The two portions of the first common voltage transfer line 77 may extend upwards along the left and right edges of the display area DA, toward the upper edge of the display area DA, from respective input pads 75. Unlike FIG. 22, the first common voltage transfer line 77 may include only a portion which extends upwards along one edge of the display area DA from one input pad 75.

Figure 23:
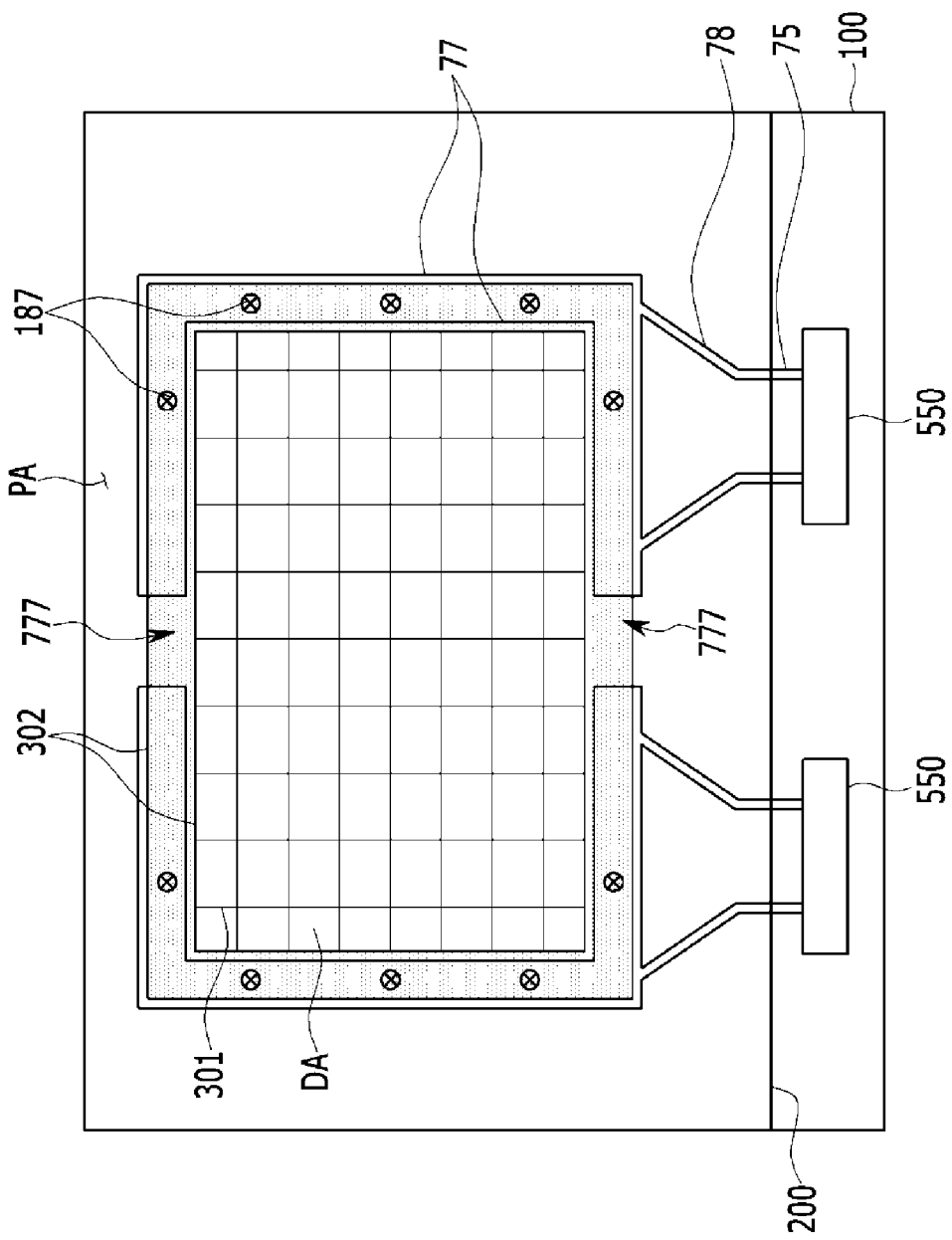

Referring to FIG. 23, the first common voltage transfer line 77 may include at least one cut portion 777. At least one cut portion 777 may be positioned at an upper portion or a lower portion of the first common voltage transfer line 77. FIG. 23 illustrates an example in which a pair of cut portions 777 is positioned at the upper portion and the lower portion of the first common voltage transfer line 77, respectively. Thus the first common voltage transfer line 77 is divided into at least two portions. In addition, the first common voltage transfer line 77 and the edge common voltage line 302 may have variously modified forms.

Figure 24:
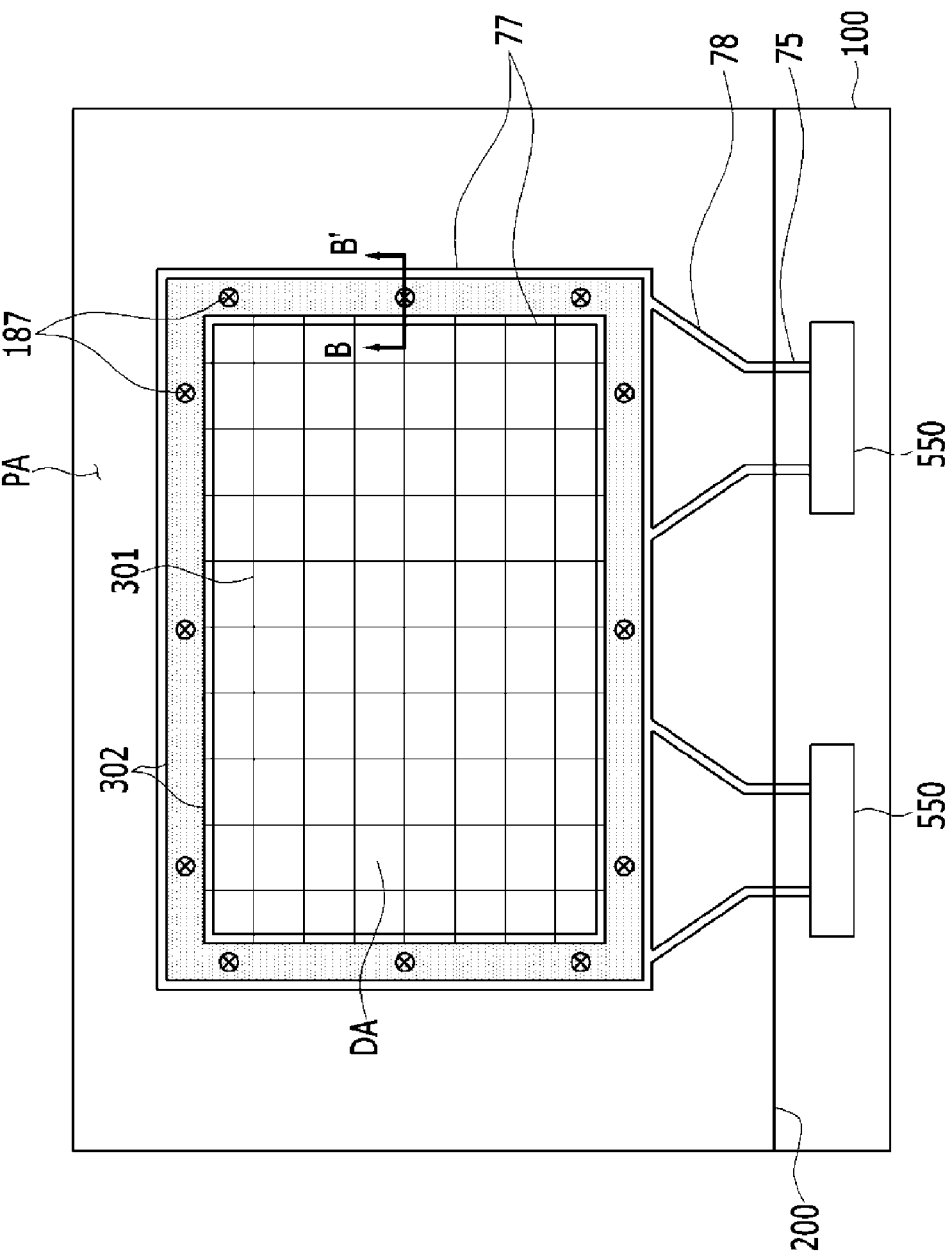
Figure 25:
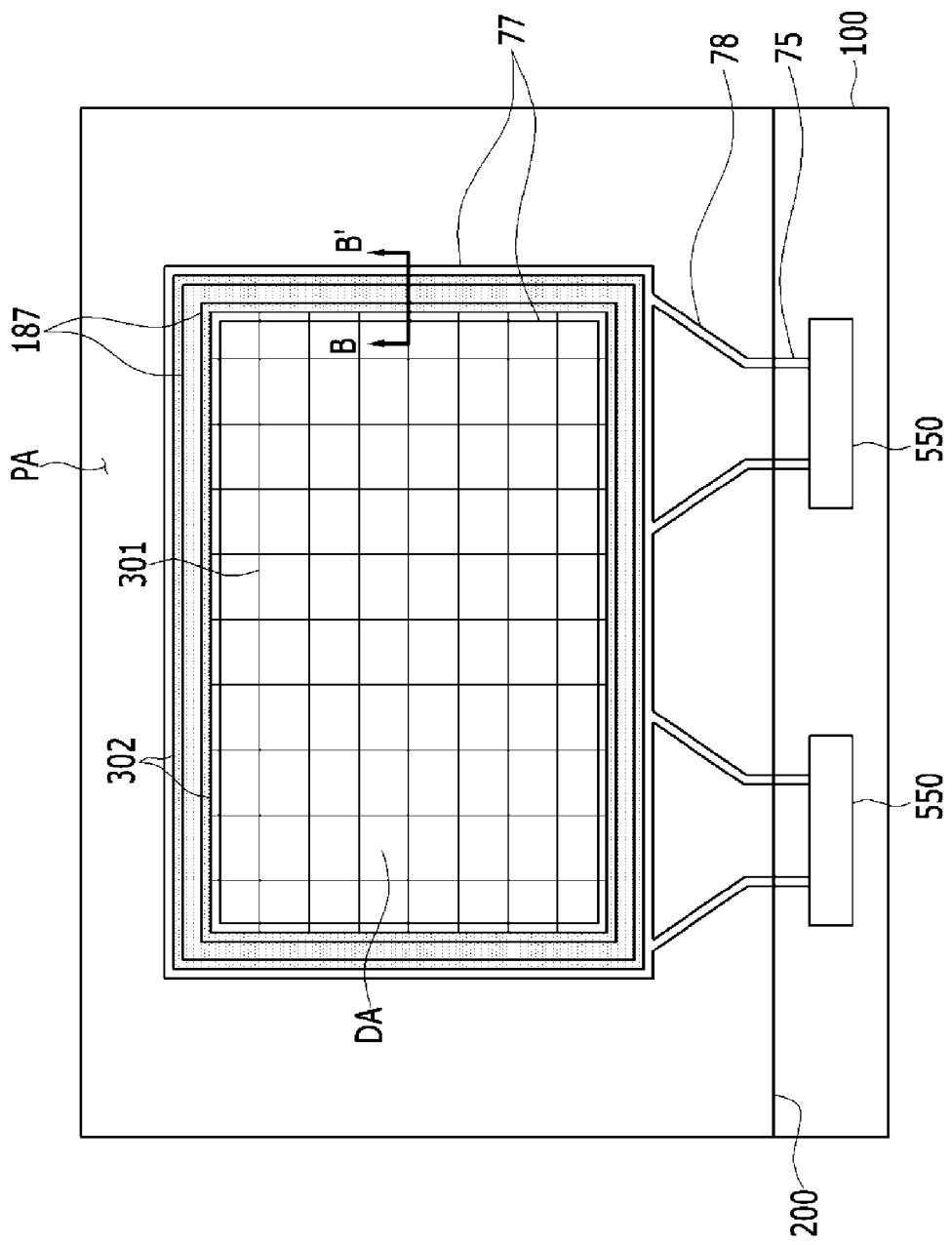

FIGS. 24 and 25 are plan views of display devices according to exemplary embodiments of the present invention. Referring to FIGS. 24 and 25 the common electrode 131 may be extended into the display area DA and the peripheral area PA. The common electrode 131 may be overlapped with the edge common voltage line 302 and the first common voltage transfer line 77, in the peripheral area PA.

Figure 26:
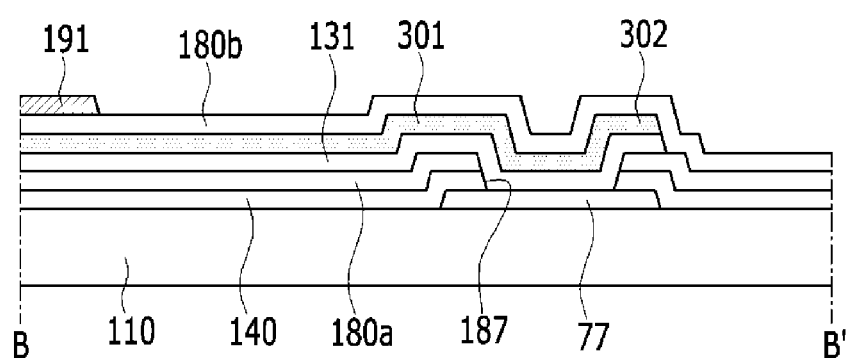
FIGS. 26 and 27 are cross-sectional views of the display device of FIG. 24 or 25, taken along line B-B'.
Figure 27:
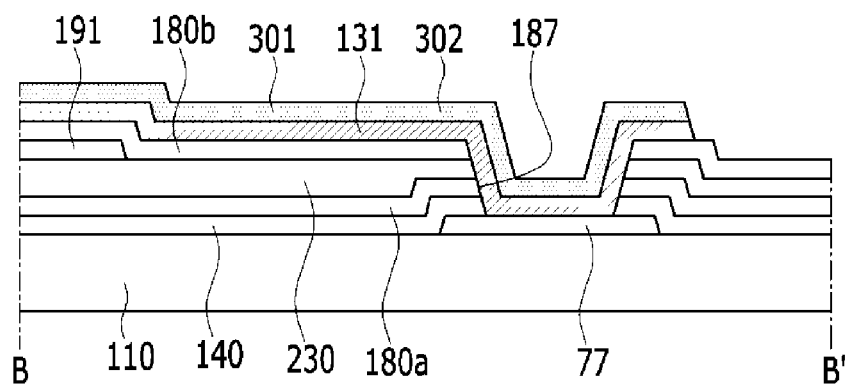

FIGS. 26 and 27 are cross-sectional views of the display devices of FIGS. 24 and 25 taken along line B-B', respectively. Referring to FIGS. 26 and 27, the common electrode 131 is expanded up to the peripheral area PA to be overlapped with the first common voltage transfer line 77. In more detail, when the common electrode 131 is positioned below the common voltage line 301 or the edge common voltage line 302, the first common voltage transfer line 77 may directly contact the common electrode 131 through the contact hole 187 in the peripheral area PA. In this case, the common electrode 131 may have substantially the same planar shape as the common voltage line 301 and the edge common voltage line 302.

Unlike FIGS. 26 and 27, when the common electrode 131 is positioned above the common voltage line 301 or the edge common voltage line 302, the first common voltage transfer line 77 may directly contact the edge common voltage line 302 through the contact hole 187 in the peripheral area PA. Even in this case, the common electrode 131 may have substantially the same planar shape as the common voltage line 301 and the edge common voltage line 302.

FIG. 26 illustrates an example in which the pixel electrode 191 is positioned above the common electrode 131 and the second passivation layer 180b is positioned on the edge common voltage line 302. FIG. 27 illustrates an example in which the pixel electrode 191 is positioned below the common electrode 131 and the second passivation layer 180b is positioned below the edge common voltage line 302.

FIG. 26 illustrates an example in which the gate insulating layer 140 and the first passivation layer 180a are positioned between the first common voltage transfer line 77 and the common voltage line 301. FIG. 27 illustrates an example in which the color filter 230 is positioned together with the gate insulating layer 140, the first passivation layer 180a, and the second passivation layer 180b, between the first common voltage transfer line 77 and the common voltage line 301. The color filter 230 may be omitted in some embodiments.

Unlike FIGS. 26 and 27, the first common voltage transfer line 77 may be directly connected with the common voltage line 301. In this case, the common electrode 131 may be positioned above the common voltage line 301 or the edge common voltage line 302.

Figure 28:
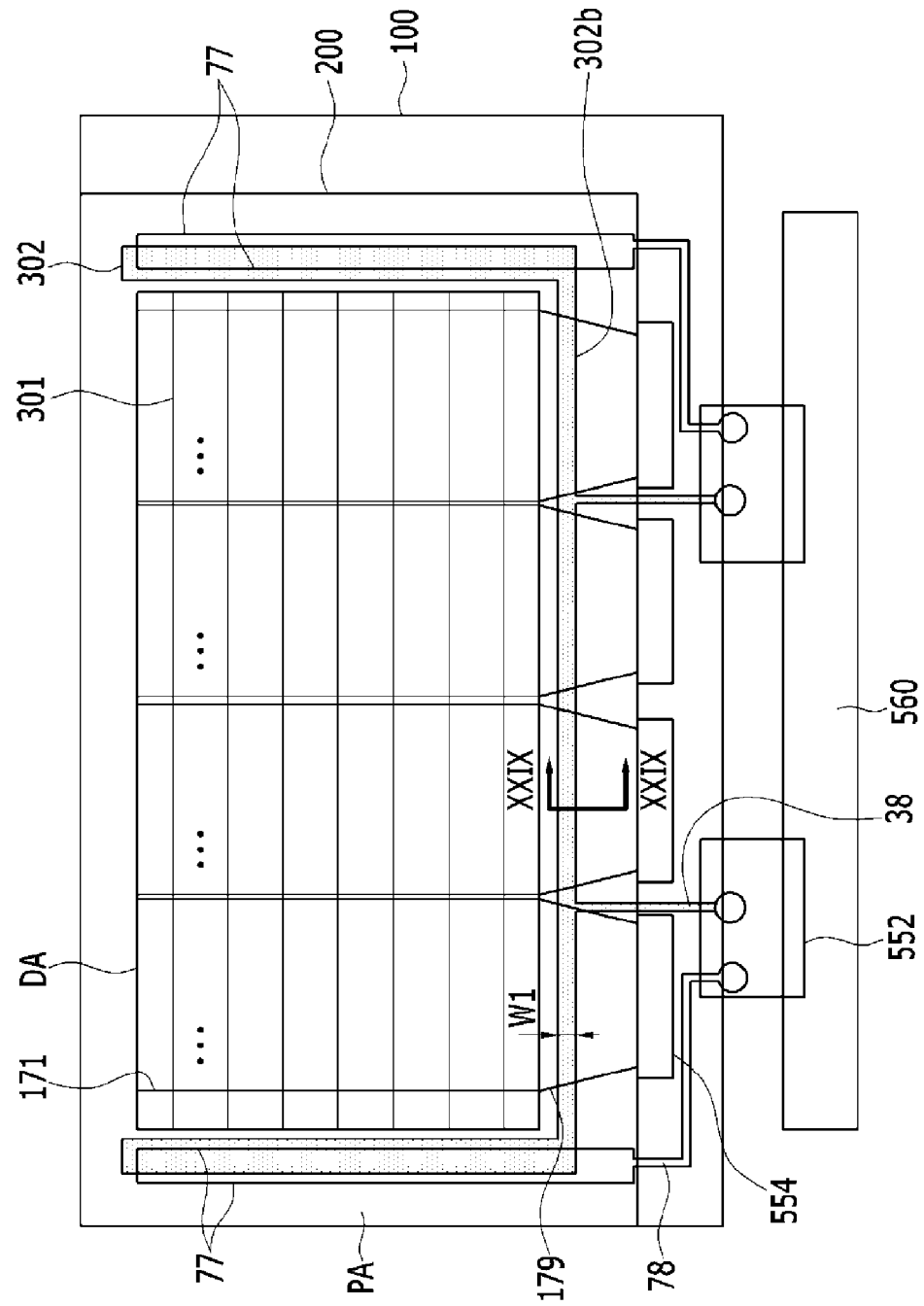
FIG. 28 is a plan view of a display device according to an exemplary embodiment of the present invention.
Figure 29:
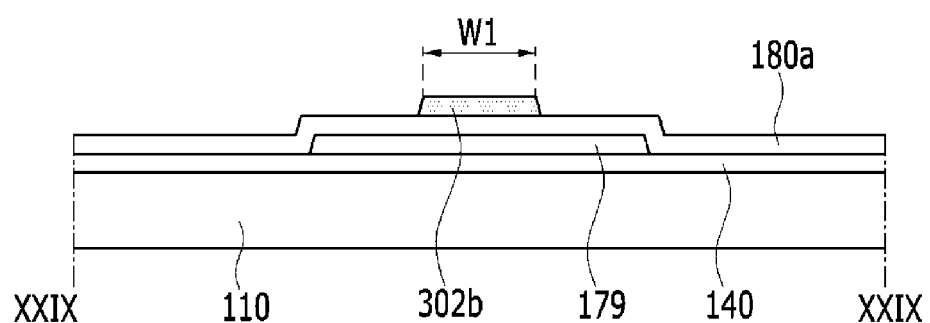
FIG. 29 is a cross-sectional view of the display device of FIG. 28, taken along line XXIX-XXIX.
Figure 30:
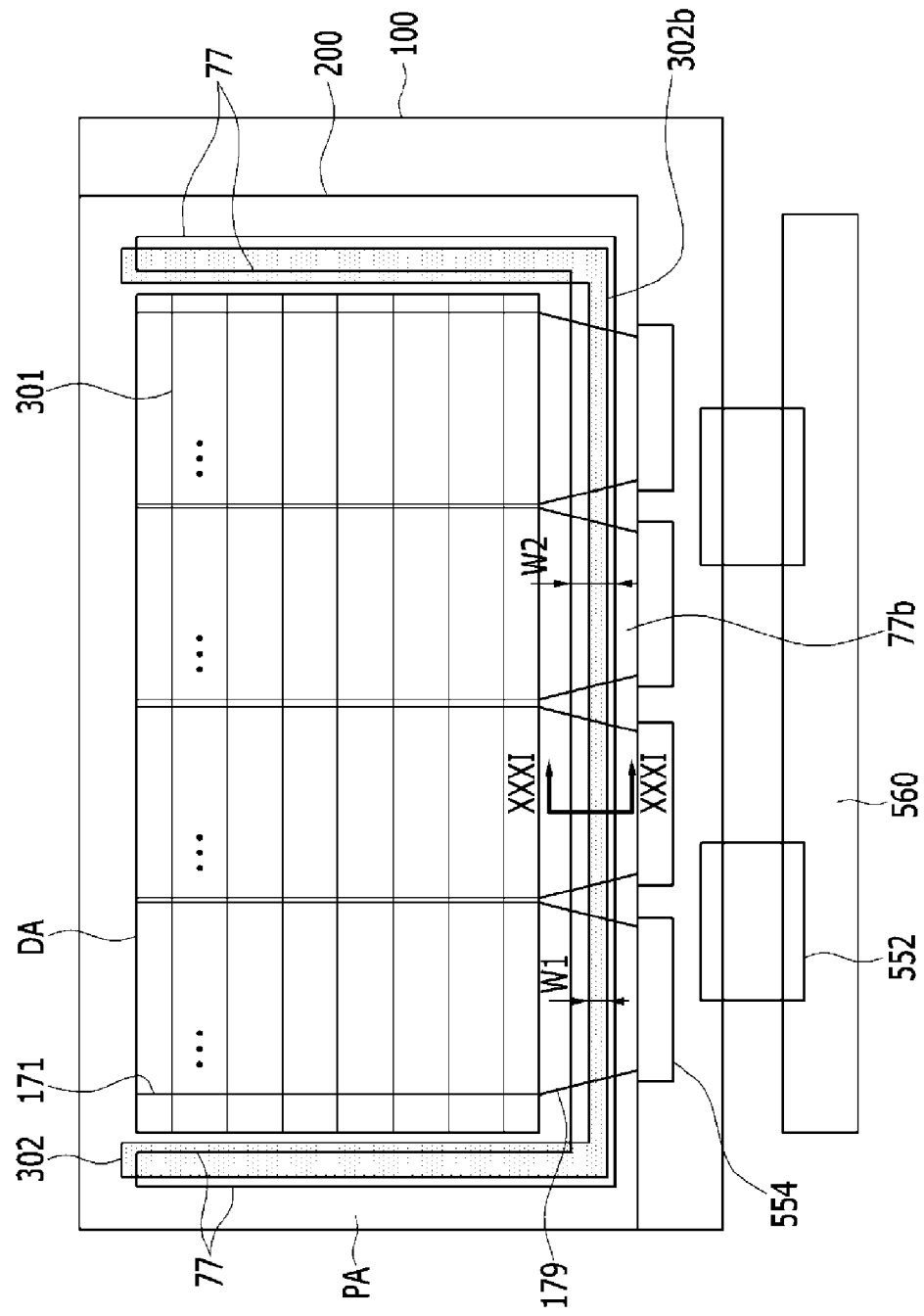
FIG. 30 is a plan view of a display device according to an exemplary embodiment of the present invention.
Figure 31:
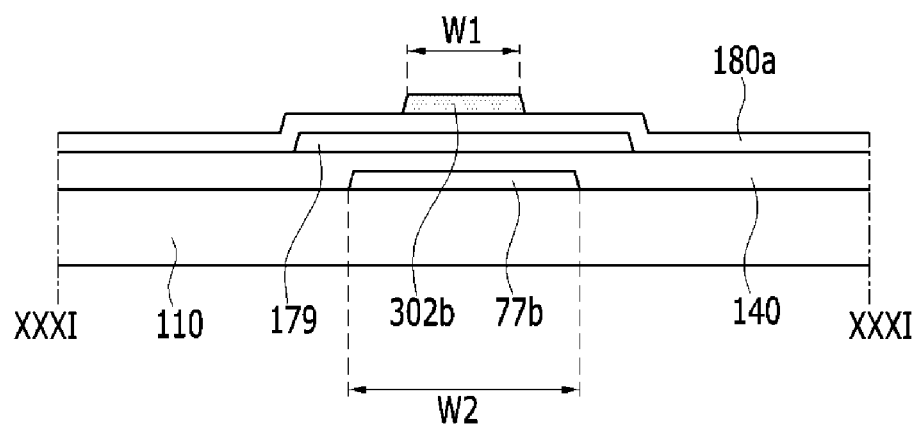
FIG. 31 is a cross-sectional view of the display device of FIG. 30, taken along line XXXI-XXXI.

FIG. 28 is a plan view of a display device according to an exemplary embodiment of the present invention, FIG. 29 is a cross-sectional view of the display device of FIG. 28, taken along line XXIX-XXIX, FIG. 30 is a plan view of a display device according to an exemplary embodiment of the present invention, and FIG. 31 is a cross-sectional view of the display device of FIG. 30, taken along line XXXI-XXXI.

Since a display device is similar to those described above, only the differences therebetween will be described in detail. The common voltage line 301 positioned in the display area DA of the first display panel 100 may include only a horizontal portion as illustrated in FIG. 28, but is not limited thereto. For example, the common voltage line 301 may also include a vertical portion like the exemplary embodiments described above.

Driving signal lines positioned in the display area DA of the first display panel 100 include gate lines and data lines 171. Particularly, the data line 171 extends to the lower peripheral area PA to form a fan-out portion 179. The fan-out portion 179 is connected with a data driving circuit 554 positioned in the exposed peripheral area PA of the first display panel 100, to receive a data signal.

The first display panel 100 may be connected with a printed circuit board 560 including circuit elements for controlling driving signals, through a flexible printed circuit film 552. The data driving circuit 554 may receive control signals from the printed circuit board 560, through the flexible printed circuit film 552. The data driving circuit 554 may be mounted on the flexible printed circuit film 552 or the printed circuit board 560.

The edge common voltage line 302 connected with the common voltage line 301 of the display area DA is formed along an edge of the display area DA. FIGS. 28 and 30 illustrate an example in which the edge common voltage line 302 is formed along left, right, and lower sides of the display area DA. Accordingly, a lower portion 302b of the edge common voltage line 302 may be overlapped with the fan-out portion 179 of the data line 171.

Referring to FIG. 29 or 31, the fan-out portion 179 of the data line 171 may be positioned on the gate insulating layer 140 positioned on the insulation substrate 110. The fan-out portion 179 of the data line 171 may be overlapped with the lower portion 302b of the edge common voltage line 302, with the first passivation layer 180a disposed therebetween. In this case, a delay of the data signal may occur due to parasitic capacitance. Accordingly, a width W1 of the lower portion 302b of the edge common voltage line 302 is decreased, thereby reducing the delay of the data signal.

The lower portion 302b of the edge common voltage line 302 is connected with the flexible printed circuit film 552 through a connecting part 38, to receive a common voltage. However, the connecting part 38 may be omitted.

The first common voltage transfer line 77 may be formed along an edge of at least one side of the display area DA. FIG. 28 illustrates an example in which the first common voltage transfer line 77 is formed along edges of two opposing sides of the display area DA. That is, the first common voltage transfer line 77 may include two opposing portions that extend along left and right edges of the display area DA. The first common voltage transfer line 77 is connected with the flexible printed circuit film 552 through a connecting wiring 78, to receive a common voltage.

The first common voltage transfer line 77 is not formed around the lower edge of the display area DA where the fan-out portion 179 of the data line 171 is positioned. As a result, the signal delay of the first common voltage transfer line 77 and the data line 171 caused by the overlap of the fan-out portion 179 may be prevented.

FIG. 30 illustrates an example in which the first common voltage transfer line 77 is formed along left, right, and lower edges of the display area DA. That is, the first common voltage transfer line 77 may include two opposing portions which extend along left and right edges of the display area DA, and a lower portion 77b connecting the two opposed portions. In this case, the lower portion 77b of the first common voltage transfer line 77 may be overlapped with the fan-out portion 179 of the data line 171.

Referring to FIG. 31, the fan-out portion 179 of the data line 171 may be overlapped with the lower portion 77b of the first common voltage transfer line 77, with the gate insulating layer 140 disposed therebetween. Even in this case, the width W2 of the lower portion 77b of the first common voltage transfer line 77 is decreased, thereby reducing the delay of the data signal, which may be due to parasitic capacitance.

Figure 32:
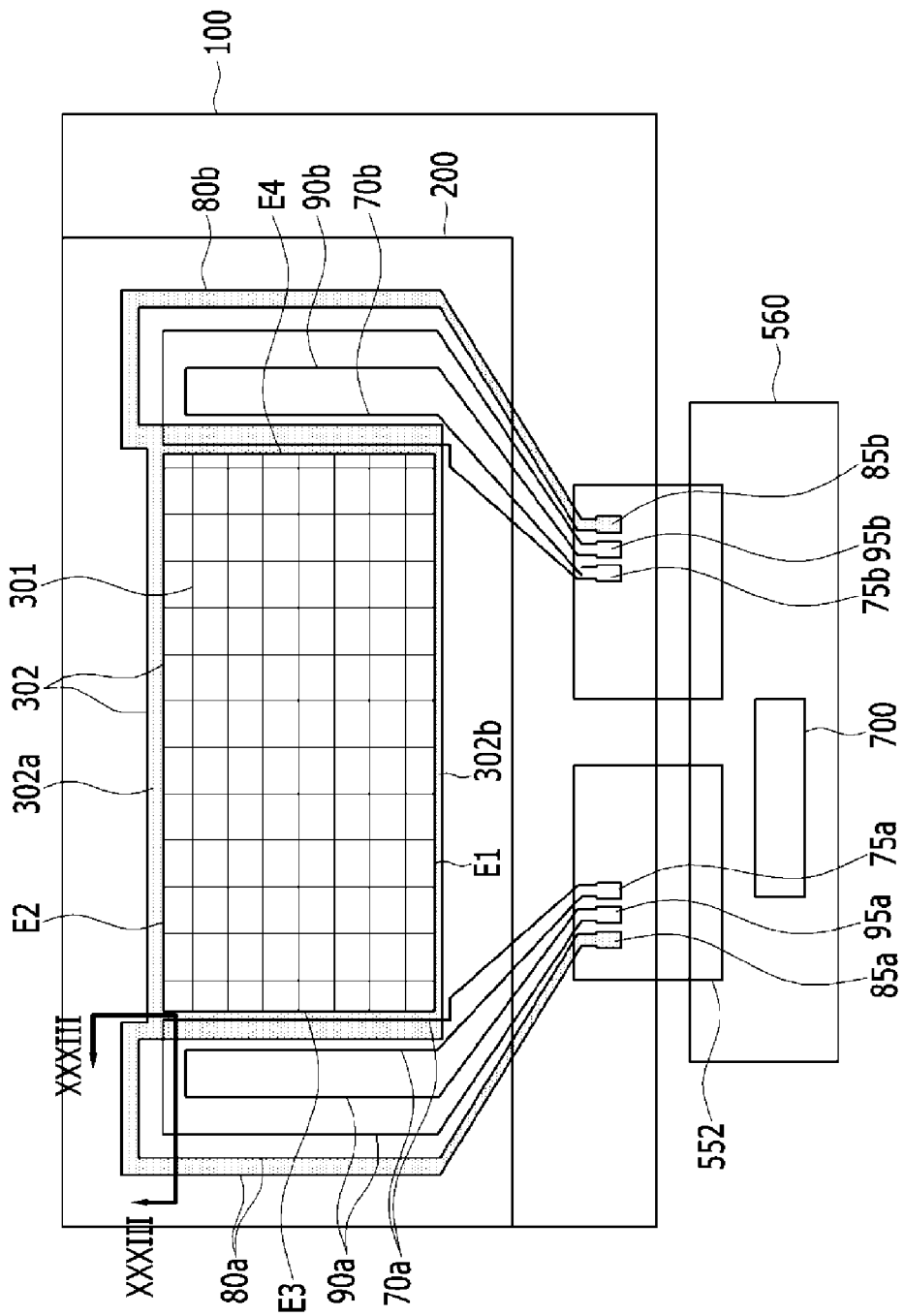
FIG. 32 is a plan view of a display device according to an exemplary embodiment of the present invention.
Figure 33:
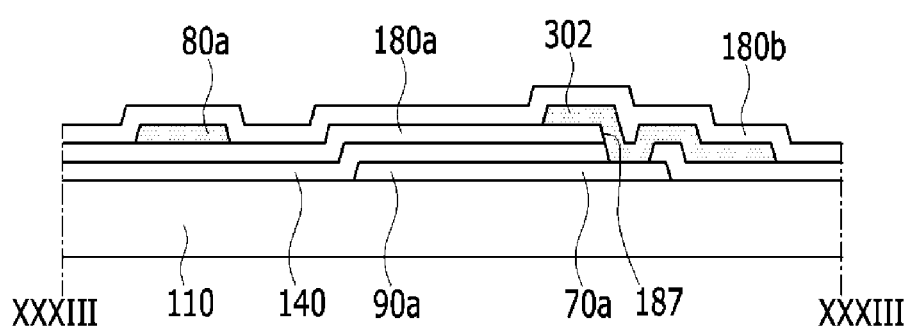
FIG. 33 is a cross-sectional view of the display device of FIG. 32, taken along line XXXIII-XXXIII

FIG. 32 is a plan view of a display device according to an exemplary embodiment of the present invention, and FIG. 33 is a cross-sectional view of the display device of FIG. 32 taken along line XXXIII-XXXIII Since the display device similar to those described above, only the differences therebetween will be described in detail.

Referring to FIG. 32, the display area DA of the first display panel 100 and/or the second display panel 200 may include a first edge E1 and a second edge E2 which face each other, and a third edge E3 and a fourth edge E4 which connect the first and second edges E1 and E2 and face each other. In FIG. 32, the display area DA is rectangular, but the shape thereof is not limited thereto.

The edge common voltage line 302 is connected with the common voltage line 301 of the display area DA and is positioned in the peripheral area PA of the first display panel 100. The edge common voltage line 302 is formed along the edges E1 to E4 of the display area DA and may include an upper portion 302a and a lower portion 302b. However, at least one of the upper portion 302a and the lower portion 302b of the edge common voltage line 302 may be omitted.

In the peripheral area PA of the first display panel 100, first common voltage transfer lines 70a and 70b and second common voltage transfer lines 90a and 90b are positioned. Referring to FIG. 33, when viewed from a cross-sectional structure, the first common voltage transfer lines 70a and 70b and the second common voltage transfer lines 90a and 90b may be positioned in the same layer or may be positioned in different layers. When viewed from a plane structure, the first common voltage transfer lines 70a and 70b may be positioned between the second common voltage transfer lines 90a and 90b and the edge of the display area DA. However, the layout of the first common voltage transfer lines 70a and 70b and the second common voltage transfer lines 90a and 90b is not limited thereto.

The first common voltage transfer lines 70a and 70b may extend along the third edge E3 or the fourth edge E4 toward the second edge E2 of the display area DA, from input pads 75a and 75b, which are positioned in the peripheral area PA adjacent to the first edge E1 of the display area DA. FIG. 32 illustrates the first common voltage transfer line 70a extending along the third edge E3 and the first common voltage transfer line 70b extending along the fourth edge E4 as an example, but any one thereof may be omitted.

The first common voltage transfer lines 70a and 70b are connected with the edge common voltage line 302 to transfer a common voltage to the edge common voltage line 302. FIG. 33 illustrates an example in which the first common voltage transfer lines 70a and 70b are connected with the edge common voltage line 302 through the contact hole 187.

The second common voltage transfer lines 90a and 90b may extend along the third edge E3 or the fourth edge E4 toward the second edge E2 of the display area DA, from the input pads 95a and 75b, which are positioned near the first edge E1 of the display area DA. In the exemplary embodiment of FIG. 32, the first common voltage transfer line 90a extending along the third edge E3 and the second common voltage transfer line 90b extending along the fourth edge E4 are exemplified. However, the present invention is not limited thereto, and any one thereof may be omitted.

The second common voltage transfer lines 90a and 90b are connected with the first common voltage transfer lines 70a and 70b near the second edge E2, to transfer a compensation common voltage to the first common voltage transfer lines 70a and 70b and the display area DA. The compensation common voltage may compensate for a deviation of the common voltage transferred along the first common voltage transfer lines 70a and 70b. In detail, in the common voltage transferred by the first common voltage transfer lines 70a and 70b, a deviation due to a load, such as resistance and parasitic capacitance, may occur. In detail, a magnitude of the common voltage transferred by the first common voltage transfer lines 70a and 70b may be decreased as a distance from the first edge E1 increases. When the deviation of the common voltage occurs, image quality may not be uniform in the display area DA and spots may occur. However, according to an exemplary embodiment of the present invention, the second common voltage transfer lines 90a and 90b may input a compensation common voltage that may minimize a difference between the common voltage input near the first edge E1 and the common voltage input near the second edge E2 to the first common voltage transfer lines 70a and 70b near the second edge E2 and the display area DA.

Referring to FIGS. 32 and 33, in the peripheral area PA of the first display panel 100, common voltage feedback lines 80a and 80b may be further positioned. When viewed in cross-section, the common voltage feedback lines 80a and 80b may be positioned in the same layer as the edge common voltage line 302 and may be made of the same material.

The common voltage feedback lines 80a and 80b may extend along the third edge E3 or the fourth edge E4 toward the second edge E2, from output pads 85a and 85b which are positioned in the peripheral area PA adjacent to the first edge E1 of the display area DA. In the exemplary embodiment of FIGS. 32 and 33, the common voltage feedback line 80a extending along the third edge E3 and the common voltage feedback line 80b extending along the fourth edge E4 are exemplified, but are not limited thereto and any one thereof may be omitted.

The common voltage feedback lines 80a and 80b receive the feedback of the common voltage from the end portions of the first common voltage transfer lines 70a and 70b near the second edge E2 or the edge common voltage line 302 connected thereto, to transfer the fed-back common voltage to the output pads 85a and 85b as a feedback voltage. Magnitudes of common voltages of the first common voltage transfer lines 70a and 70b or the compensation common voltages of the second common voltage transfer lines 90a and 90b may be determined based on the feedback voltage transferred by the common voltage feedback lines 80a and 80b.

Referring to FIG. 32, the display device may further include a signal controller 700. The signal controller 700 may transfer the common voltage to the first common voltage transfer lines 70a and 70b through the input pads 75a and 75b and may transfer the compensation common voltage to the second common voltage transfer lines 90a and 90b through the input pads 95a and 95b. Further, the signal controller 700 receives the feedback voltage from the common voltage feedback lines 80a and 80b to determine the common voltage and the compensation common voltage based thereon. The signal controller 700 may be directly mounted on the first display panel 100 in an IC chip form, mounted on the flexible printed circuit film 552 to be attached to the first display panel 100, or mounted on the printed circuit board 560 to be connected with the input pads 75a, 75b, 95a, and 95b and the output pads 85a and 85b through the flexible printed circuit film 552 as illustrated in FIG. 32.

Figure 34:
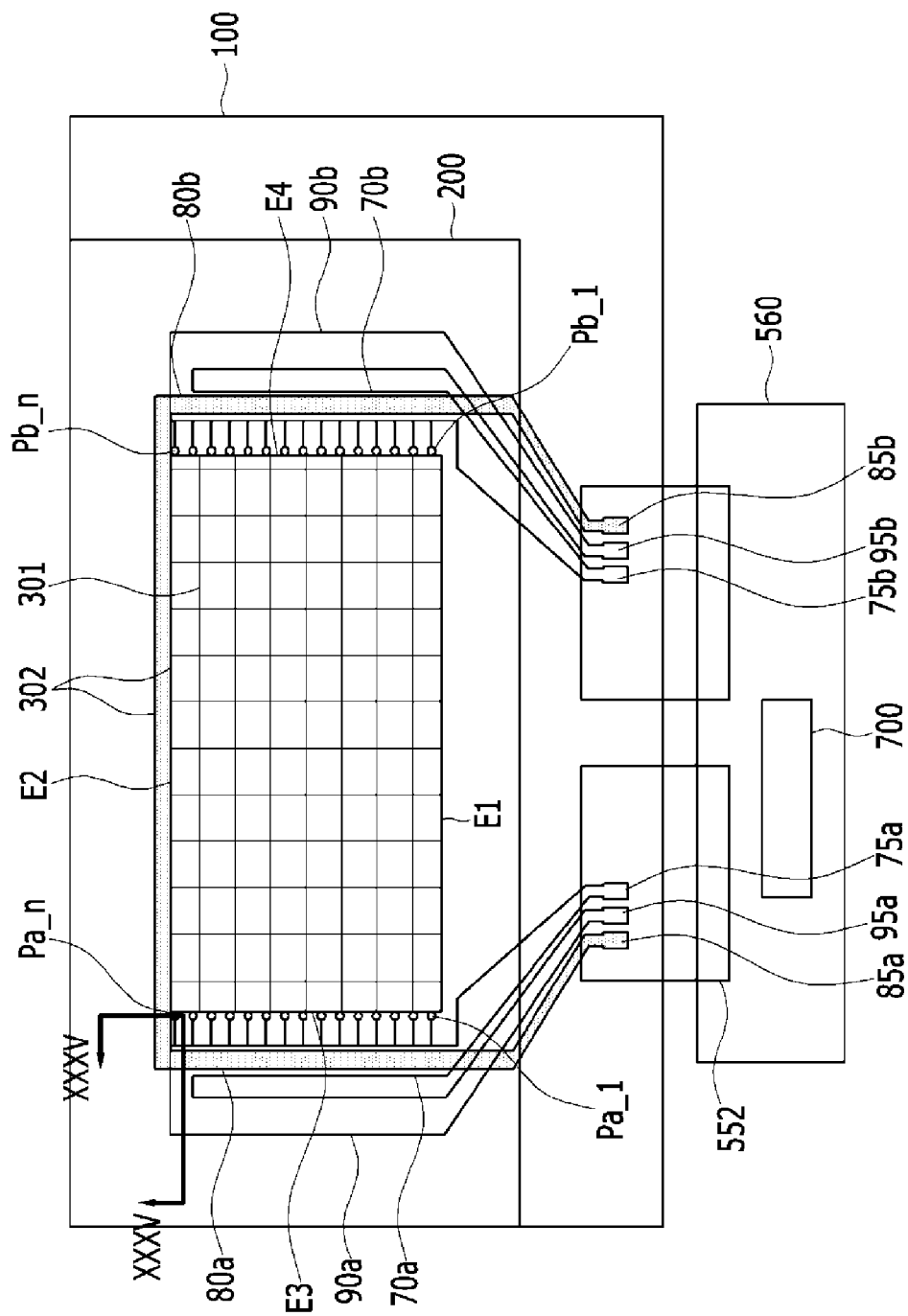
FIG. 34 is a plan view of a display device according to an exemplary embodiment of the present invention.
Figure 35:
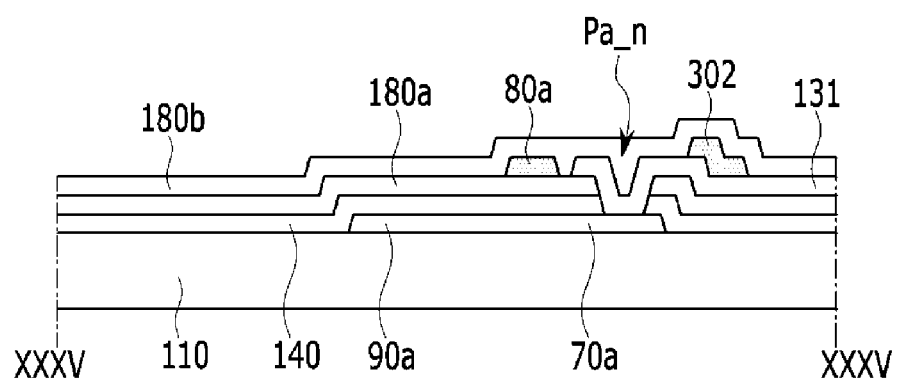
FIG. 35 is a cross-sectional view of the display device of FIG. 34, taken along line XXXV-XXXV.

FIG. 34 is a plan view of a display device according to an exemplary embodiment of the present invention, and FIG. 35 is a cross-sectional view of the display device of FIG. 34, taken along line XXXV-XXXV. Since the display device similar to those described above, only the differences therebetween will be described in detail.

The edge common voltage line 302 may be formed along the second edge E2 of four sides of the display area DA. The first common voltage transfer lines 70a and 70b and the second common voltage transfer lines 90a and 90b are positioned in the peripheral area PA of the first display panel 100. The first common voltage transfer lines 70a and 70b input the common voltage to the common voltage line 301 or the common electrode 131 of the display area DA, through a plurality of common voltage input points Pa_1, ..., Pa_n, Pb_1, Pb_n (hereinafter, referred to as input points for brevity) (n is a natural number of 2 or more). The input points Pa_1, ..., Pa_n, Pb_1, Pb_n may be positioned in the peripheral area PA adjacent to the display area DA, but may be positioned at the edge of the display area DA. The input points Pa_1, ..., Pa_n, Pb_1, Pb_n may be sequentially arranged along the third edge E3 or the fourth edge E4 of the display area DA.

Referring to FIG. 35, the input points Pa_1, ..., Pa_n, Pb_1, Pb_n may include, for example, contact holes. That is, in the input points Pa_1, ..., Pa_n, Pb_1, Pb_n, the first common voltage transfer lines 70a and 70b may be connected with the common electrode 131 or the common voltage line 301, through at least one contact hole of the gate insulating layer 140 and the first passivation layer 180a.

The second common voltage transfer lines 90a and 90b are connected with the first common voltage transfer lines 70a and 70b near the second edge E2 of the display area DA to transfer the compensation common voltage to the first common voltage transfer lines 70a and 70b and the display area DA, like the exemplary embodiment described above.

Referring to FIGS. 32 and 33, the common voltage feedback lines 80a and 80b may be further positioned in the peripheral area PA of the first display panel 100. When viewed in cross-section, the common voltage feedback lines 80a and 80b may be positioned in the same layer as the edge common voltage line 302.

The common voltage feedback lines 80a and 80b receive the feedback of the common voltage from the end portion of the edge common voltage line 302 near the second edge E2, to transfer the fed-back common voltage to the output pads 85a and 85b as a feedback voltage.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
a substrate comprising pixels disposed in a display area and a peripheral area disposed around the display area;
a common electrode and a pixel electrode disposed in the display area of the substrate and overlapping with each other;
a first insulating layer disposed between the common electrode and the pixel electrode;
a common voltage line disposed above or below the common electrode and contacting the common electrode;
an edge common voltage line connected to the common voltage line and comprising a portion extending along an edge of the display area, wherein the edge common voltage line is disposed in the same layer as the common voltage line;
a first common voltage transfer line contacting the edge common voltage line in the peripheral area and configured to transfer a common voltage to the common voltage line; and
a second insulating layer disposed between the edge common voltage line and the first common voltage transfer line,
wherein the second insulating layer comprises a contact hole exposing the first common voltage transfer line, and
the edge common voltage line contacts the first common voltage transfer line through the contact hole.

2. The display device of claim 1, wherein the contact hole extends along the edge of the display area.

3. The display device of claim 2, wherein the contact hole exposes a side surface of the first common voltage transfer line.

4. The display device of claim 3, wherein the common electrode extends into the peripheral area and overlaps with the first common voltage transfer line.

5. The display device of claim 4, wherein the first insulating layer is disposed on the edge common voltage line.

6. The display device of claim 5, further comprising:
a gate line disposed on the substrate and configured to transfer a gate signal; and
a data line insulated from the gate line and configured to transfer a data signal, wherein,
the second insulating layer is disposed between the gate line and the data line, wherein the first common voltage transfer line is disposed in the same layer as any one of the gate line and the data line.

7. The display device of claim 6, wherein the second insulating layer comprises an organic material comprising a color filter.

8. The display device of claim 7, wherein the common voltage line and the edge common voltage line comprise a metal.

9. The display device of claim 8, wherein the common voltage line overlaps with at least one of the gate line and the data line.

10. The display device of claim 9, wherein:
the data line comprises a fan-out portion disposed in the peripheral area; and
the first common voltage transfer line is not overlapped with the fan-out portion.

11. The display device of claim 10, wherein:
the display area has four sides; and
the first common voltage transfer line comprises a portion extending along at least one of the four sides of the display area.

12. The display device of claim 11, wherein:
the first common voltage transfer line comprises an input pad;
the display area has a first side disposed adjacent to the input pad, a second side facing the first side, and a third side connecting the first side and the second side;
the first common voltage transfer line extends along the third side; and
the display device further comprises a second common voltage transfer line that extends along the third side and is configured to transfer a compensation common voltage to compensate for a deviation of a common voltage, to an end portion of the first common voltage transfer line that is disposed adjacent to the second side.

13. The display device of claim 12, further comprising a common voltage feedback line extending along the third side and configured to transfer a voltage of an end portion of the first common voltage transfer line that is disposed adjacent to the second side, to an output pad as a feedback voltage.

14. The display device of claim 13, wherein the common voltage feedback line is disposed in the same layer as the edge common voltage line.

15. The display device of claim 1, wherein the contact hole exposes a side surface of the first common voltage transfer line.

16. A display device, comprising:
a substrate comprising pixels disposed in a display area and a peripheral area disposed around the display area;
a common electrode and a pixel electrode disposed in the display area of the substrate and overlapping with each other;
a first insulating layer disposed between the common electrode and the pixel electrode;
a common voltage line disposed above or below the common electrode and contacting the common electrode;
an edge common voltage line connected to the common voltage line and comprising a portion extending along an edge of the display area, wherein the edge common voltage line is disposed in the same layer as the common voltage line; and
a first common voltage transfer line contacting the edge common voltage line in the peripheral area and configured to transfer a common voltage to the common voltage line,
wherein the common electrode extends into the peripheral area and overlaps with the first common voltage transfer line.

17. A display device, comprising:
a substrate comprising pixels disposed in a display area and a peripheral area disposed around the display area;
a common electrode and a pixel electrode disposed in the display area of the substrate and overlapping with each other;
a first insulating layer disposed between the common electrode and the pixel electrode;
a common voltage line disposed above or below the common electrode and contacting the common electrode;
an edge common voltage line connected to the common voltage line and comprising a portion extending along an edge of the display area, wherein the edge common voltage line is disposed in the same layer as the common voltage line;
a first common voltage transfer line contacting the edge common voltage line in the peripheral area and configured to transfer a common voltage to the common voltage line;
a gate line disposed on the substrate and configured to transfer a gate signal;
a data line insulated from the gate line and configured to transfer a data signal; and
a second insulating layer disposed between the gate line and the data line,
wherein the first common voltage transfer line is disposed in the same layer as any one of the gate line and the data line.

18. The display device of claim 17, wherein the second insulating layer comprises an organic material comprising a color filter.

* * * * *